(12) United States Patent
Morris et al.

(10) Patent No.: US 9,929,982 B2
(45) Date of Patent: Mar. 27, 2018

(54) DESIGNATING AUTOMATED AGENTS AS FRIENDS IN A SOCIAL NETWORK SERVICE

(75) Inventors: Meredith J. Morris, Bellevue, WA (US); Jaime Teevan, Bellevue, WA (US); Brent Hecht, Chicago, IL (US); Daniel J. Liebling, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 991 days.

(21) Appl. No.: 13/162,608

(22) Filed: Jun. 17, 2011

(65) Prior Publication Data

US 2011/0252108 A1  Oct. 13, 2011

Related U.S. Application Data

(63) Continuation-in-part of application No. 12/756,202, filed on Apr. 8, 2010.

(51) Int. Cl.
*G06F 17/00* (2006.01)
*H04L 12/58* (2006.01)

(52) U.S. Cl.
CPC .............. *H04L 51/02* (2013.01); *H04L 51/32* (2013.01)

(58) Field of Classification Search
CPC ......... G06F 17/30067; G06F 17/30575; G06F 17/30212
USPC .................................................. 707/634, 706
See application file for complete search history.

(56) References Cited

U.S. PATENT DOCUMENTS

| | | |
|---|---|---|
| 7,296,016 B1 | 11/2007 | Farach-Colton et al. |
| 7,359,894 B1 | 4/2008 | Liebman et al. |
| 7,818,336 B1 | 10/2010 | Amidon et al. |
| 2006/0150119 A1* | 7/2006 | Chesnais et al. ............. 715/810 |
| 2006/0235873 A1 | 10/2006 | Thomas |
| 2006/0259555 A1* | 11/2006 | Hassounah et al. .......... 709/206 |
| 2007/0203906 A1 | 8/2007 | Cone et al. |
| 2007/0214097 A1 | 9/2007 | Parsons et al. |
| 2007/0245245 A1 | 10/2007 | Blue et al. |
| 2007/0260598 A1 | 11/2007 | Odom |
| 2008/0005072 A1 | 1/2008 | Meek et al. |

(Continued)

OTHER PUBLICATIONS

Beenan, et al., "Using Social Psychology to Motivate Contributions to Online Communities," retrieved at <<http://www.acm.org>>, Proceedings of the 2004 ACM Conference on Computer Supported Cooperative Work, 2004, pp. 212-221.

(Continued)

*Primary Examiner* — Mariela Reyes
*Assistant Examiner* — Mohsen Almani

(57) ABSTRACT

A system is described in which a user can add one or more automated agents as "friends" in a social network service. In operation, an automated agent observes an information need expressed by the user via the social network service, e.g., in the form of an original message posted to the social network service; determines whether it is appropriate to reply to the information need; uses automated functionality to generate a reply message to the information need (if it is deemed appropriate to reply to the information need); and sends the reply message to a target destination, such as a social network page associated with the user. For example, without limitation, one type of automated agent performs a question-answering function. Another type of automated agent performs a social referral service.

15 Claims, 14 Drawing Sheets

(56) References Cited

U.S. PATENT DOCUMENTS

| | | | |
|---|---|---|---|
| 2008/0133495 | A1 | 6/2008 | Fischer |
| 2009/0125511 | A1* | 5/2009 | Kumar ............................. 707/5 |
| 2009/0164929 | A1 | 6/2009 | Chen et al. |
| 2009/0192884 | A1 | 7/2009 | Lo |
| 2009/0204599 | A1 | 8/2009 | Morris et al. |
| 2009/0281988 | A1* | 11/2009 | Yoo ................................. 707/3 |
| 2009/0282002 | A1 | 11/2009 | Reeder et al. |
| 2009/0307205 | A1* | 12/2009 | Churchill et al. ................ 707/5 |
| 2011/0106895 | A1* | 5/2011 | Ventilla .................. G06Q 10/10 709/206 |
| 2011/0246910 | A1* | 10/2011 | Moxley et al. ............... 715/758 |
| 2011/0252011 | A1 | 10/2011 | Morris et al. |

OTHER PUBLICATIONS

Blingham, et al., "VizWiz: Nearly Real-time Answers to Visual Questions," retrieved at <<http://www.acm.org>>, Proceedings of the 23nd Annual ACM Symposium on User Interface Software and Technology, 2010, pp. 333-342.

Cassell, John, "More than Just Another Pretty Face: Embodied Conversational Interface Agents," retrieved at <<citeseerx.ist.psu.edu/viewdoc/download?doi=10.1.1.15.3319>>, Communications of the ACM, vol. 43, 9 pages.

Chen, et al., "Speak Little and Well: Recommending Conversations in Online Social Streams," retrieved at <<http://www.acm.org>>, Proceedings of the 2011 Annual Conference on Human factors in Computing Systems, May 2011, 217-226.

Chilton, et al., "Addressing People's Information Needs Directly in a Web Search Result," retrieved at <<http://www.acm.org>>, Proceedings of the 20th International Conference on World Wide Web, Apr. 2011, pp. 27-36.

Danescu-Niculescu-Mizil, et al., "Mark My Words! Linguistic Style Accommodation in Social Media," retrieved at <<http://www.acm.org>>, Proceedings of the 20th International Conference on World Wide Web, Apr. 2011, pp. 745-754.

Dumais, et al., "Web Question Answering: is More Always Better?," retrieved at <<http://www.acm.org>>, Proceedings of the 25th Annual International ACM SIGIR Conference on Research and Development in Information Retrieval, 2002, pp. 291-298.

Efron, et al., "Questions are Content: A Taxonomy of Questions in a Microblogging Environment," retrieved at <<http://www.acm.org>>, Proceedings of the 73rd ASIS&T Annual Meeting on Navigating Streams in an Information Ecosystem, vol. 47, Oct. 2010, 10 pages.

Evans, et al., "An Elaborated Model of Social Search," retrieved at <<http://brynnevans.com/papers/elaborated-model-of-social-search.pdf>>, Information Processing and Management: an International Journal, vol. 46, Issue 6, Nov. 2010, pp. 656-678.

Evans, et al., "Towards a Model of Understanding Social Search," retrieved at <<http://www.acm.org>>, Proceedings of the 2008 ACM Conference on Computer Supported Cooperative Work, 2008, pp. 485-494.

Evans, et al., "Exploring the Cognitive Consequences of Social Search," retrieved at <<http://www.acm.org>>, Proceedings of the 27th International Conference Extended Abstracts on Human Factors in Computing Systems, 2009, pp. 3377-3382.

Facebook Statistics, 2011, retrieved at <<http://www.facebook.com/press/info.php?statistics>>, Facebook, Palo Alto, CA, retrieved on Jun. 17, 2011, 1 page.

Gilbert, et al., "Predicting Tie Strength with Social Media," retrieved at <<http://www.acm.org>>, Proceedings of the 27th International Conference on Human Factors in Computing Systems, 2009, pp. 211-220.

Harper, et al., "Facts or Friends? Distinguishing Informational and Conversational Questions in Social Q&A Sites," retrieved at <<http://www.acm.org>>, Proceedings of the 27th International Conference on Human Factors in Computing Systems, 2009, pp. 759-768.

Hecht, et al., "Tweets from Justin Bieber's Heart: The Dynamics of the 'Location' Field in User Profiles," retrieved at <<http://www.acm.org>>, Proceedings of the 2011 Annual Conference on Human Factors in Computing Systems, May 2011, pp. 237-246.

Hecht, et al., "Terabytes of Tobler: Evaluating the First Law in a Massive, Domain-neutral Representation of World Knowledge," retrieved at <<http://www.brenthecht.com/papers/bhecht_cosit2009_tolberslaw.pdf>>, Proceedings of the 9th International Conference on Spatial Information Theory, 2009, 18 pages.

Horowitz, et al., "The Anatomy of a Large-scale Social Search Engine," retrieved at <<http://www.acm.org>>, Proceedings of the 19th International Conference on World Wide Web, Apr. 2010, pp. 431-440.

Horowitz, et al., "The Lumiere Project: Bayesian User Modeling for Inferring the Goals and Needs of Software Users," retrieved at << ftp://ftp.research.microsoft.com/pub/ejh/lum.pdf>>, Proceedings of the Fourteenth Conference on Uncertainty in Artificial Intelligence, Jul. 1998, 10 pages.

Kraut, et al., "Dealing With Newcomers," retrieved at <<http://www.cs.cmu.edu/~kraut/RKraut.site.files/articles/kraut10-Newcomers-current.pdf>>, 2010, retrieved on Jun. 17, 2011, 42 pages.

"Climate Cyborg brings global-warming debate to Twitter," retrieved at <<http://www.wjla.com/blogs/weather/2011/02/climate-cyborg-brings-global-warming-debate-to-twitter-8599.html>>, TBD Blog Directory, Feb. 16, 2011, 2 pages.

Lindgaard, et al., "Attention Web Designers: You have 50 Milliseconds to Make a Good First Impression!," retrieved at <<http://anaandjelic.typepad.com/files/attention-web-designers-2.pdf>>, Behavior & Information Technology, vol. 25, No. 2, 2006, pp. 115-126.

Metcalfe, John, "Climate Cyborg Brings Global-warming Debate to Twitter," retrieved at <<http://www.wjla.com/blogs/weather/2011/02/climate-cyborg-brings-global-warming-debate-to-twitter-8599.html>>, TBD.com, All Over Washington, Feb. 16, 2011, 2 pages.

Morris, et al., "A Comparison of Information Seeking Using Search Engines and Social Networks," retrieved at <<http://research.microsoft.com/en-us/um/people/merrie/papers/icwsm_searching_vs_asking.pdf>>, Proceedings of ICWSM'2010, 2010, 4 pages.

Morris, et al., "What Do People Ask their Social Networks, and Why? A Survey Study of Status Message Q&A Behavior," retrieved at <<http://www.acm.org>>, Proceedings of the 28th International Conference on Human factors in Computing Systems, 2010, pp. 1739-1748.

Nass, et al., "Computers are Social Actors," retrieved at <<http://www.acm.org>>, Proceedings of the SIGCHI Conference on Human Factors in Computing Systems: Celebrating Independence, 1994, pp. 72-78.

Paek, et al., "Predicting the Importance of Newsfeed Posts and Social Network Friends," retrieved at <<http://research.microsoft.com/pubs/135702/1878-8304-1-PB[1].pdf>>, Proceedings of the Twenty-Fourth AAAI Conference on Artificial Intelligence (AAAI-10), Jul. 2010, pp. 1419-1424.

Paul, et al., "Is Twitter a Good Place for Asking Questions? A Characterization Study," retrieved at <<http://www2.parc.com/ist/members/hong/publications/icwsm2011_qanda.pdf>>, Proceedings of the Fifth International AAAI Conference on Weblogs and Social Media, Jul. 2011, 4 pages.

Ramage., et. al, "Characterizing Microblogging Using Latent Topic Models," retrieved at <<http://www.stanford.edu/~dramage/papers/twitter-icwsm10.pdf>>, Proceedings of the 4th International AAAI Conference on Weblogs and Social Media, May 2010, 8 pages.

Ramakrishan, et al., "Is Question Answering an Acquired Skill?," retrieved at <<http://www.acm.org>>, Proceedings of the 13th International Conference on World Wide Web, 2004, pp. 111-120.

"Relevance Meets the Real-time Web," retrieved at <<http://googleblog.blogspot.com/2009/12/relevance-meets-real-time-web.html>>, The Official Google Blog, Google Inc., Mountain View, CA, Dec. 2009, 5 pages.

Taylor, Bret, "Bringing Your friends to Bing: Search Now More Social," retrieved at <<http://www.facebook.com/blog.php?post=437112312130>>, The Facebook Blog, Facebook, Palo Alto, CA, Oct. 13, 2010, 3 pages.

(56) References Cited

OTHER PUBLICATIONS

Teevan, et al., "Factors Affecting Response Quantity, Quality, and Speed for Questions Asked via Social Network Status Messages," retrieved at <<http:// www.aaai.org>>, Proceedings of the Fifth International AAAI Conference on Weblogs and Social Media, Jul. 2011, pp. 630-633.

Weizenbaum, et al., "A Computer Program for the Study of Natural Language Communication Between Man and Machine," retrieved at <<http://www.acm.org>>, Communications of the ACM, vol. 9, Issue 1, Jan. 1966, pp. 36-45.

White, et al., "Effects of Community Size and Contact Rate in Synchronous Social Q&A," retrieved at <<http://www.acm.org>>, Proceedings of the 2011 Annual conference on Human Factors in Computing Systems, May 2011, pp. 2837-2846.

Yang, et al., "Culture Matters: A Survey Study of Social Q&A Behavior," retrieved at <<http://www-personal.umich.edu/~ladamic/papers/socialQnA/CultureSocialQnA.pdf>>, Fifth International AAAI Conference on Weblogs and Social Media, Jul. 2011, 8 pages.

Matsuo, et al., "POLYPHONET: An Advanced Social Network Extraction System from the Web," retrieved at <<http://www2006.org/programme/files/pdf/4042.pdf>>, Proceedings of the 15th International Conference on World Wide Web, 2006, 10 pages.

"Search Results Based on your Social Network," retrieved at <<http://slashdot.org/article.pl?sid=08/02/01/1830247&from=rss>>, slashdot.org, Feb. 1, 2008, 14 pages.

Aardvark search engine home page, retrieved at <<http://vark.com/>>, retrieved on Oct. 21, 2009, Aardvark, San Francisco, CA, 2 pages.

"Questions and Answers via Twitter—LazyTweet," retrieved at <<http://www.lazytweet.com/>>, Twitter, San Francisco, CA, retrieved on Oct. 21, 2009, 2 pages.

Talbot, David, "Cuil Tries to Rise Again," retrieved at <<http://www.technologyreview.com/web/23038/>>, Technology Review, Jul. 22, 2009, 2 pages.

White, et al., "Characterizing and Predicting Search Engine Switching Behavior," retrieved at <<http://research.microsoft.com/en-us/um/people/ryenw/papers/WhiteCIKM2009.pdf>>, Proceeding of the 18th ACM Conference on Information and Knowledge Management, Nov. 2009, 10 pages.

Derene, Glenn, "How Social Networking could Kill Web Search as We Know It," retrieved at <<http://www.popularmechanics.com/technology/industry/4259135.html>>, Popular Mechanics, Apr. 16, 2008, 2 pages.

Lackie, Robert J., "Social Networking Sites and Personal Information Search Engines," retrieved at <<http://www.infotoday.com/il2006/Presentations/S201_Lackie.pdf>>, Rider University, Oct. 24, 2006, 6 pages.

"Aardvark (search engine)," retrieved at <<http://en.wikipedia.org/wiki/Aardvark_(search_engine)>>, retrieved on Jul. 29, 2011, Wikipedia.org online encyclopedia, 4 pages.

"Quora" retrieved at <<http://en.wikipedia.org/wiki/Quora>>, retrieved on Jul. 29, 2011, Wikipedia.org online encyclopedia, 5 pages.

"About Quora," retrieved at <<http://www.quora.com/about/>>, retrieved on Jul. 29, 2011, Quora, Palo Alto, CA, 2 pages.

Morris, Meredith Ringel, "How Do My Writer Friends Think I Should Title This Paper? A Study of How Social Network Questions Shape the Replies," retrieved at <<https://agora.cs.illinois.edu/download/attachments/34867299/Facebook_merrie.pptx?version=1&modificationDate=1287000601000>>, presentation slides, retrieved on Jul. 29, 2011, 4 pages.

"About LazyTweet," retrieved at <<http://www.lazytweet.com/about>>, retrieved on Jul. 29, 2011, Twitter, San Francisco, CA, 3 pages.

Mislove, et al., "Exploiting Social Networks for Internet Search," retrieved at <<http://citeseerx.ist.psu.edu/viewdoc/download?doi=10.1.1.107.2420&rep=rep1&type=pdf>>, Proceedings of the 5th Workshop on Hot Topics in Networks, 2006, pp. 79-84.

Yu, et al., "Searching Social Networks," retrieved at <<http://citeseerx.ist.psu.edu/viewdoc/download?doi=10.1.1.6.9248&rep=rep1&type=pdf>>, Proceedings of the Second International Joint conference on Autonomous Agents and Multiagent Systems, 2001, 8 pages.

Basuga, et al., "The MAgNet: Agent-based Middleware Enabling Social Networking for Mobile Users," retrieved at <<http://ieeexplore.ieee.org/stamp/stamp.jsp?tp=&arnumber=5206371>>, Proceedings of the 10th International Conference on Telecommunications, 2009, 8 pages.

\* cited by examiner

# DESIGNATING AUTOMATED AGENTS AS FRIENDS IN A SOCIAL NETWORK SERVICE This invention is a continuation-in-part of Ser. No. 12/756,202 (the '202 application), filed on Apr. 8, 2010, entitled, "Integrating a Search Service with a Social Network Resource," naming the inventors of Meredith J. Morris, et al. The '202 patent application is incorporated by reference herein in its entirety.

BACKGROUND

A user commonly retrieves information from online resources using a search engine, such as the Bing™ search engine provided by Microsoft Corporation of Redmond, Wash. In this approach, the user submits a search query that includes one or more key terms. The search engine responds by identifying and forwarding results that match the search query.

A user can also obtain information by interacting with one or more human contacts using a social network service. Well known examples of such services include Facebook, Inc. of Palo Alto, Calif., MySpace of Beverly Hills, Calif., and LinkedIn of Mountain View, Calif., etc. In this type of service, a user may create a profile and establish links to other users who also maintain profiles on the service. Yet another popular type of social network service is Twitter of San Francisco, Calif. In this type of service, a user can send short messages (i.e., "tweets") to recipients (i.e., "followers") who wish to receive these messages.

The above-mentioned types of social network services are predominantly used to provide information to recipient users who wish to receive it. But users sometimes use these services to actively pose questions. For example, a user can pose a question in the form of a status message in a user page provided by the Facebook service; or a user can send out a "tweet" that poses a question using the Twitter service. A friend or follower can manually reply to the question by posting a response to a status message or sending a response "tweet," respectively.

Search engines and social network services have respective strengths and weaknesses as tools for answering a user's questions. In view thereof, some efforts have been made to combine features of search engines and social network services. Yet there remains room for improvement in such hybrid type of systems.

SUMMARY

A system is described in which a user can add one or more automated agents as "friends" in a social network service, e.g., by designating those agents as contacts as if they were human friends. In operation, an automated agent observes an indication of an information need expressed via the social network service; determines whether it is appropriate to reply to the information need; generates a reply message to the information need (if it is deemed appropriate to reply to the information need); and sends the reply to a target destination, such as a social network page associated with the user, at the appropriate time. In one example, the information need can be expressed by an original message (or plural messages) posted to the social network service.

A user can select from among different automated agents which perform different respective functions. For example, one type of automated agent performs a question-answering function. Another type of automated agent performs a social referral service. The Detailed Description sets forth additional types of automated agents.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative system that enables users to add automated agents as "friends" in one or more social network services. Section B describes illustrative methods which explain the operation of the system of Section A. Section C describes illustrative computing functionality that can be used to implement any aspect of the features described in Sections A and B.

Figure 24:
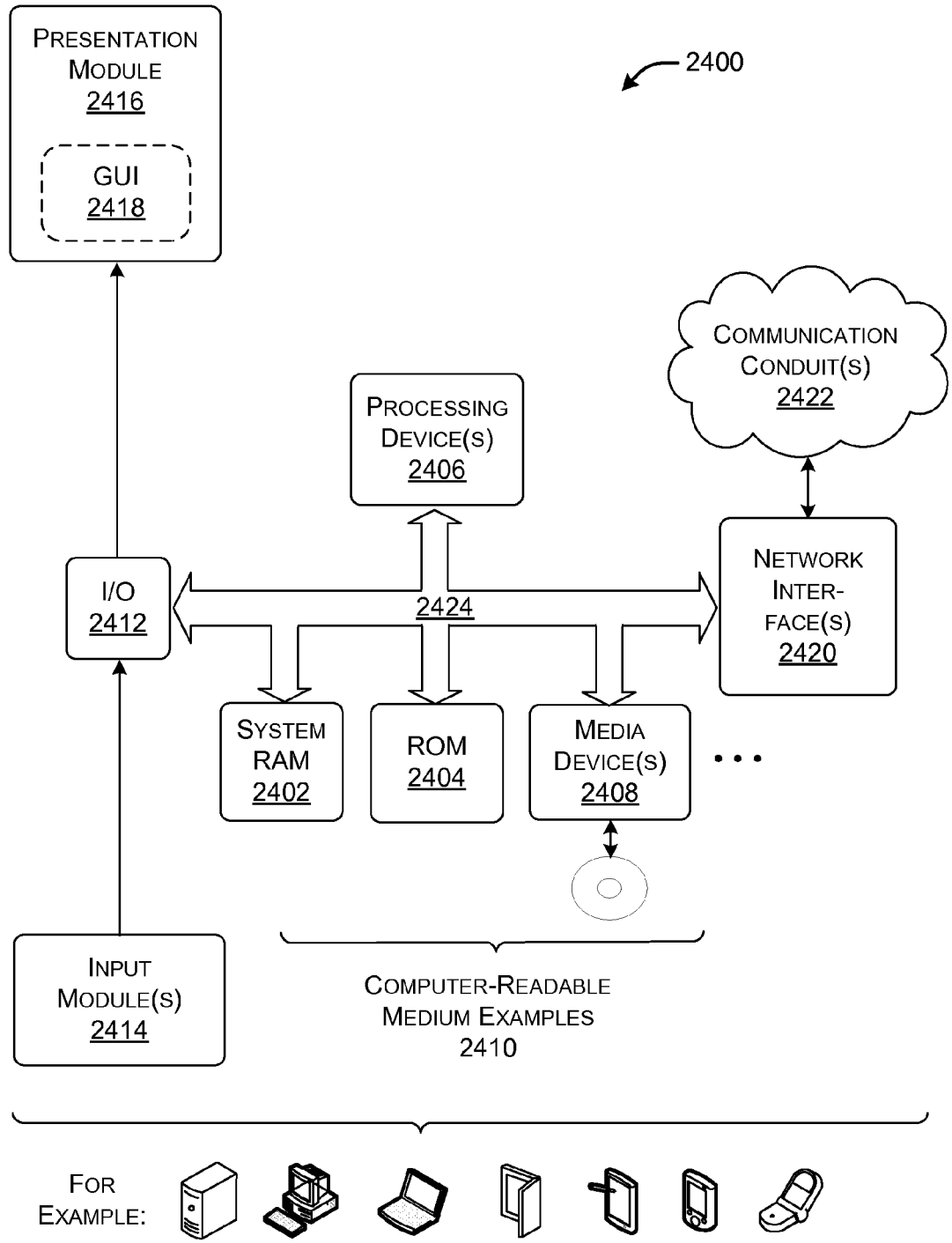
FIG. 24 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 24, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not to be interpreted as an exhaustive indication of features that can be duplicated. Finally, the terms "exemplary" or "illustrative" refer to one implementation among potentially many implementations.

A. Illustrative Systems

Figure 1:
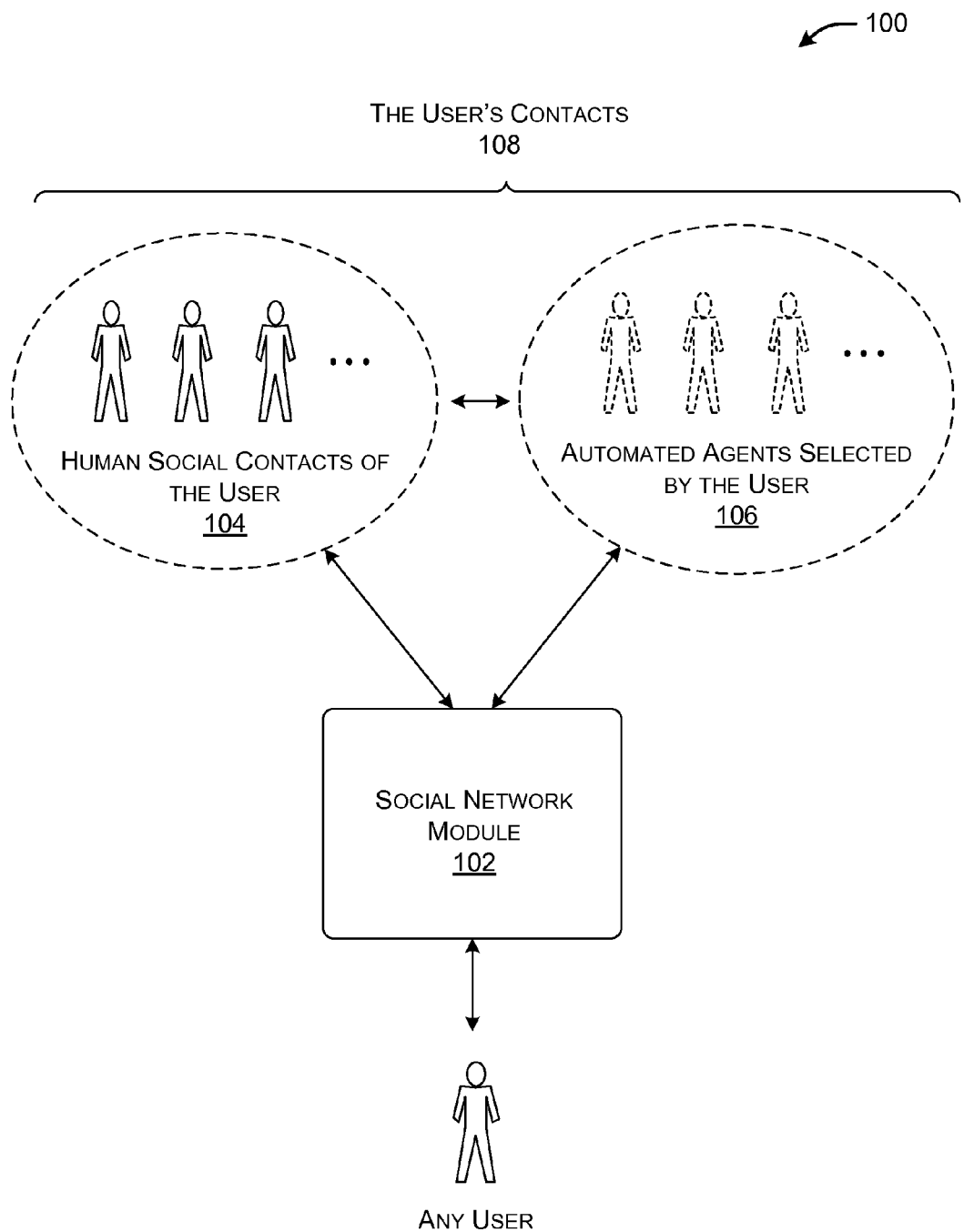
FIG. 1 shows an overview of a system that includes one or more automated agents, any of which can be selected as "friend" in a social network service.

FIG. 1 shows an overview of an illustrative system 100 that includes at least one social network module 102. The social network module 102 implements a social network service. The social network service allows any user to interact with a group of human social contacts 104 (referred to for brevity below as "human contacts" or simply "friends"). The human contacts can have any relationship to the user. In one method of interaction, a user may post a message using the social network service. The human contacts may then visit the user's page(s) (and/or any other page or forum or mechanism by which the message is accessible) to read the message and optionally respond to the message. In another method of interaction, a user may use the social network service to generate and distribute a short message to his or her human contacts.

The types of social network interaction mentioned above are representative, not exhaustive. Alternative types of social network services accommodate interaction via blogs, Email messaging, instant messaging, real-time voice communication (e.g., voice-over-IP), etc. In each case, the social network service includes some mechanism for allowing the user to choose his or her group of human contacts 104, followed by some mechanism for allowing the user to interact with the human contacts 104.

The system 100 of FIG. 1 also allows the user to choose one or more automated agents 106 as contacts. As such, the user's complete set of contacts 108 can include both the human contacts 104 and automated agents 106. The automated agents pertain to computer-implemented modules, rather than human agents. But the automated agents perform roles and engage in interactions that are otherwise analogous to human contacts. For example, in one implementation, the automated agents can read and respond to the messages that the user posts via the social network service using the same methods of interaction as a human contact.

More generally, an automated agent addresses an information need expressed via the social network module 102. In some cases, the information need can be explicitly expressed via the social network module 102. For example, a user may explicitly post a message via the social network module 102 which poses a question or otherwise evinces an information need. Alternatively, or in addition, an automated agent can infer the information need based on other information expressed via the social network module. For example, the automated agent can also base its response, at least in part, on profile information maintained by the social network module 102. However, to facilitate explanation, it will henceforth be assumed that posted messages comprise the primary vehicle through which users express their information need.

The automated agents perform different respective functions and may also have different styles (e.g., "personalities"). For example, one type of automated agent performs a question-answering function. Here, the automated agent may perform a search or other form of information retrieval on the basis of information extracted from a message posted by a user via a social network service. The automated agent then provides a reply message which reflects the outcome of the question-answering process. Another type of automated agent performs a social referral function. Here, the automated agent identifies one or more human contacts that may be able to assist the user with an issue identified in the user's message. The following description sets forth additional details regarding these types of automated agents, among other types.

As a general note, the following explanation sometimes specifically calls out functions performed by human contacts and/or functions directed to human contacts, etc. Although not always explicitly stated, any such reference to a human contact is to be interpreted as also encompassing an automated agent. For example, as will be explained below, an automated agent can generate a reply message that, in turn, is in response to another reply message that has been authored by a human contact. But an automated agent can also generate a response to a reply message that has been generated by another automated agent. This means that one automated agent can effectively "converse" with another automated agent; one or more human users are the beneficiaries of the information imparted by this exchange between the automated agents.

Figure 2:
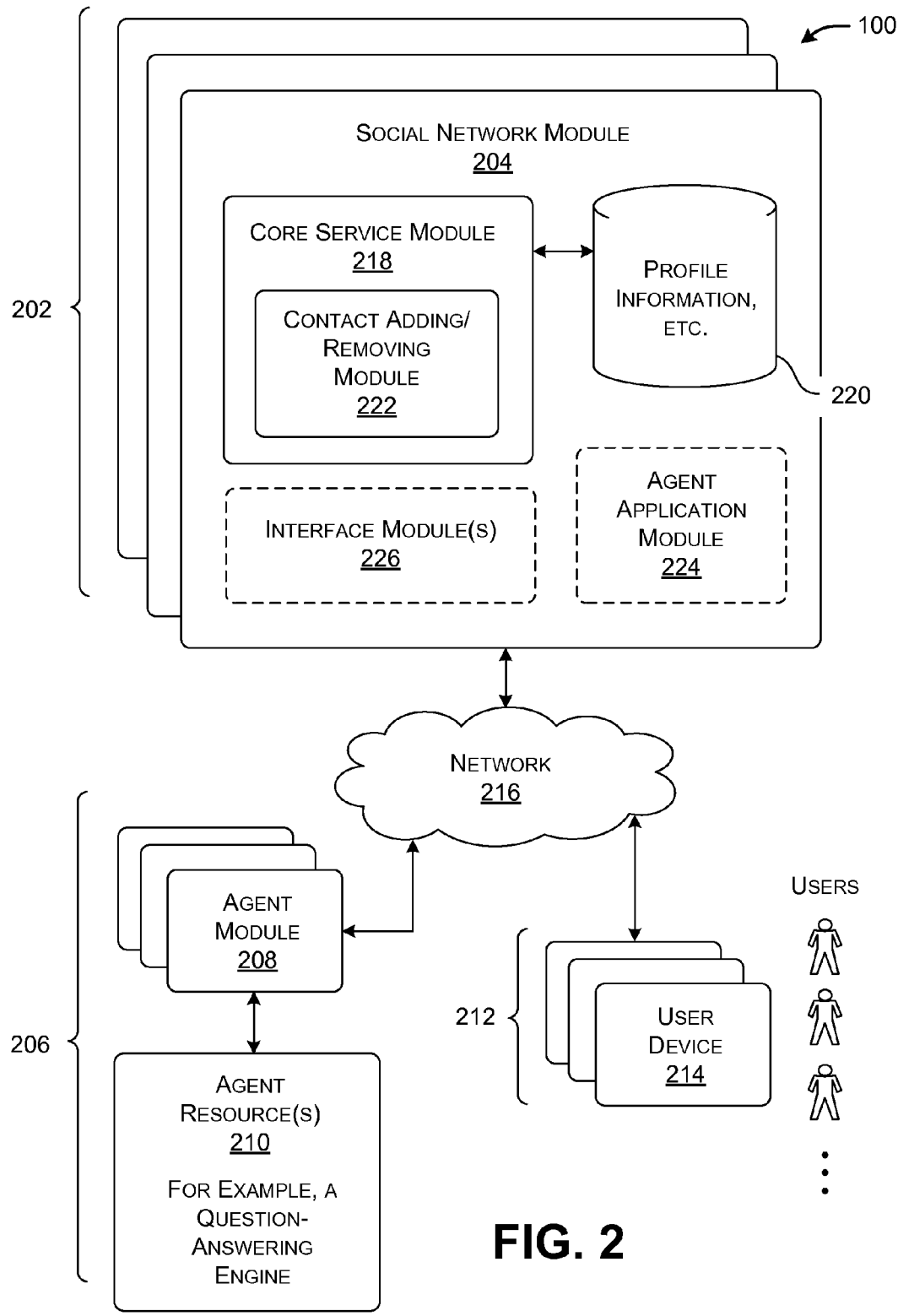
FIG. 2 shows one illustrative implementation of the system of FIG. 1.

Advancing to FIG. 2, this figure shows one way to implement the system 100 of FIG. 1. The system 100 shown in FIG. 2 includes one or more social network modules 202, each for implementing a social network service of any type. The social network modules 202 will be described in the context of a representative social network module 204, although different social network modules 202 can also vary from each other in any manner.

The social network module 204 can be implemented using any type of computing functionality, such as one or more computer servers, one or more data stores, routing functionality, and so forth. The computing functionality of the social network module 204 can be implemented at a single site or may be distributed over plural sites.

The system 100 also includes one or more automated agent modules 206 for performing any respective functions. In one case, the agent modules 206 (or some of the agent modules 206) are implemented by a single encompassing system. That system may allow the agent modules 206 to utilize shared system resources. In another case, at least some of the agent modules 206 can be implemented by separate respective systems. In the following, the agent modules 206 will be described in the context of a representative agent module 208, although different agent modules 206 can also vary from each other in any manner.

The representative agent module 208 may interact with one or more agent resources 210, referred to in the singular below for brevity. The agent resource 210 refers to any functionality that enables the agent module 208 to provide its service. For example, as mentioned above, some types of agent modules perform a question-answering function in response to messages posted to a social network service and/or other expressions of information need. In this illustrative context, the agent resource 210 represents a question-answering engine of any kind. As used herein, the terms "question-answering function" and "question-answering engine" have broad connotation. A question-answering function generally refers to any mechanism for retrieving or otherwise providing information which may answer a question. In one case, for example, a question-answering engine refers to a search engine which generates search responses using a ranking algorithm and a search index. In another case, a question-answering engine refers to a database lookup mechanism. In another case, a question-answering engine refers to a mechanism for analyzing the user's question and providing a natural-language response to the user's question, and so on. Likewise, the question-answering engine can provide different types of responses. In one case, the question-answering engine conveys a source (or sources) which provide general information which may be pertinent to the user's question, e.g., by identifying one or more websites that may contain information that answers the user's question. Alternatively, or in addition, the question-answering engine can provide a factual-based response that attempts to directly answer the user's question. Alternatively, or in addition, the question-answering engine can offer opinion-related content in response to a user's question.

In those cases in which the automated agent performs a search, the automated agent can provide search results in a dynamic manner (for example, in one case, taking, a few seconds at most). In another case, the automated agent can provide search results in potentially delayed fashion. The automated agent may opt for this latter approach to provide sufficient time to investigate the user's query through any mechanism or combination of mechanisms (e.g., through computation of any kind, by consulting one or more human participants, etc.). The automated agent forwards a response to the user when it has collected sufficient information to answer the user's query; or the automated agent can provide multiple staggered responses to the user as it receives relevant information.

In some cases, the agent resource 210 can be considered as an integral part of the agent module 208. In other cases, the agent resource 210 and the agent module 208 can be considered as separate functionalities, administered by the same entity or different respective entities. In one case, the agent module 208 can interact with the agent resource 210 via an interface (e.g., an application programming interface) provided by the agent resource 210.

The agent module 208 can be implemented using any type of computing functionality, such as one or more computer servers, one or more data stores, routing functionality, and so forth. The computing functionality of the agent module 208 can be implemented at a single site or may be distributed over plural sites. In one case, the agent module 208 is administered by the same entity that administers the social network module 204. In another case, the agent module 208 and the social network module 204 are administered by different respective entities.

The system 100 also includes a set of user devices 212. The user devices 212 will be described in the context of a representative user device 214, although different user devices 212 can also vary from each other in any manner. The user device 214 may represent any type of computing functionality, such as a personal computer, a computer workstation, a game console device, a set-top box device, a mobile telephone, a book-reader device, a personal digital assistant device, etc. In one case, the user device 214 may include browser functionality (not shown) that allows a user to interact with the social network module 204 (and, indirectly, with the agent module 208).

A network 216 connects the various components illustrated in FIG. 2 together. The network 216 can be implemented in any manner, e.g., by a local area network, a wide area network (e.g., the Internet), etc., or any combination thereof. The network 216 can include any combination of hardwired links, wireless links, routers, gateway functionality, name servers, etc., governed by any protocol or combination of protocols.

Now referring to the social network module 204 in greater detail, this module can include a core service module 218 for implementing various functions of the social network module 204. For example, the core service module 218 can manage user data associated with a plurality of users who maintain accounts with the social network module 204. Part of the user data for a particular user may comprise profile information. The profile information describes the characteristics of the user at any level of granularity. The profile information may also identify the contacts of the user, and/or provide profile information of those contacts. The user data may also include messages that the user has sent and received via the social network module 204. A data store 220 can store the user data.

The core service module 218 may also provide one or more user interface pages that present user data for each user. For each user, these pages can be accessed by the user and any authorized contacts of the user. Such pages are referred to generically herein as user pages. The core service module 218 can allow a user to interact with his or her user page(s) by updating profile information, viewing existing messages, creating new messages, and so on. In some types of social network services, a user may also add messages to other users' personal pages. In some types of social network services, a user may also send and receive direct messages to/from other users.

The core service module 218 may also include a contact adding/removing module. As the name suggests, the contact adding/removing module 222 allows a user to add and remove human contacts to his or her list of friends. For example, in one scenario, a user may perform a search to identify a user page associated with a particular user. The user may then activate an appropriate command to add that user as a new human contact of the user.

In one situation, the social network module 204 does not distinguish between human contacts and automated agents. In this case, the core service module 218 can add and remove automated agents in the same manner that it adds and removes human contacts (e.g., using the adding/removing module 222). In another implementation, the social network module 204 can use a dedicated protocol and/or functionality to add and remove automated agents to a list of contacts. Additional information regarding one such protocol will be described below in the context of the explanation of FIG. 3.

The social network module 204 may use at least one optional agent application module 224. The agent application module 224 can perform various functions that enable the social network module 204 to work in conjunction with the agent module 208. In some implementations, the system 100 adds the agent application module 224 to a user's account when the user opts to interact with one or more agent modules. The types of functions performed by the agent application module 224 are environment-specific, depending on the architecture and protocols used by a particular social network module.

The social network module 204 can also include one or more interface module(s) 226 (e.g., one or more application programming interfaces). The interface module(s) 226 provides an interface by which the agent module 208 can receive messages from the social network module 204 and post reply messages to the social network modules 202.

As a final general point, the allocation of functions shown in FIG. 2 can be modified in any manner. For example, certain functions attributed to the social network module 204 can be performed by the agent module 208, and vice versa. Alternatively, or in addition, certain functions described above as being performed by the social network module 204 or the agent module 208 can instead be performed in a local manner by the user device 214, in whole or in part.

Figure 3:
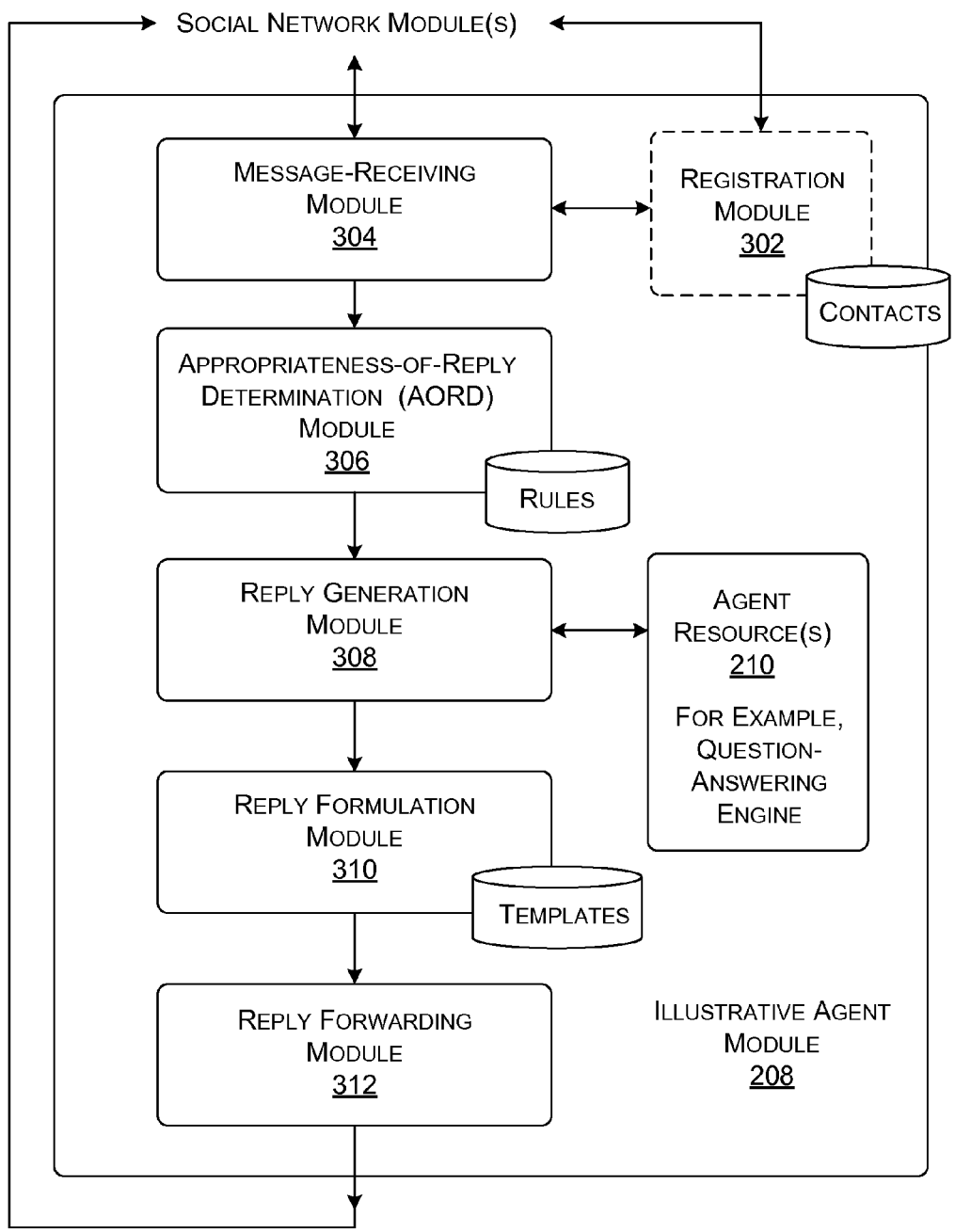
FIG. 3 shows one illustrative implementation of an automated agent module that can be used in the system of FIG. 2.

FIG. 3 shows additional details regarding one possible construction of the representative agent module 208 shown in FIG. 2. By way of overview, in one implementation, the agent module 208 receives and responds to at least one message posted by a user via the social network module 204, that message being a representative expression of information need. That message is referred to as an original message herein to indicate that it is a source message that provokes a response from the automated agent (and possibly from one or more human contacts). In most of the examples presented herein, the original message corresponds to an initial message in a thread that poses a question. But the original message need not pose a question. Further, in other cases, the original message may correspond to a reply message posted by any user in response to some earlier message or messages. In other words, the original message need not occur at the start of a conversation thread. In that case, the automated agent responds to the reply message. At any time, an automated agent may also respond to two or more messages, such as an initial message from a user that poses an initial query together with a reply message from one of the user's human contacts. To facilitate explanation, however, FIG. 3 will be explained in the representative context of receiving and responding to a single original message that poses a question.

Beginning at the top of the figure, a registration module 302 can provide various services that allow a user to register the agent module 208 as a "friend" in the social network service implemented by the social network module 204. More specifically, in one case, each agent module 208 can implement its own registration module 302. In another case, plural agent modules 206 can rely on a shared registration module 302 to perform the registration task. In another case, some other functionality (such as the social network module 204) can implement the registration module 302.

The registration module 302 can adopt various different registration procedures, depending, in part, on the protocols and architectures used by the different social network modules 202. In one procedure, a user may visit a website provided by the registration module 302. There, the registration module 302 can invite the user to select one or more social network modules to which he or she wishes to add agent modules as friends. The registration module 302 can then present the user with a menu that identifies the different types of agent modules that can be added as friends. The user selects one or more agent modules from this menu.

In some cases, the above actions are sufficient to add a designated agent module as a friend to the designated social network modules. In other cases, the user may be asked to perform additional operations. For example, consider the case in which the user wishes to add the agent module 208 to a social network service implemented by the social network module 204. The user may be asked to visit a profile page associated with the agent module 208, as provided by the social network module 204. There, the user may designate the agent module 208 as a friend. The social network module 204 can then notify the registration module 302 of the user's action; the registration module 302 responds by logging into an account associated with the agent application module 224 and accepting the user's request. To repeat, the above-described procedure is representative, not limiting; different environments can use different protocols for adding automated agents as friends. The registration module 304 can store registration information in a contact store, identifying users who have selected the agent module 208 as a contact.

The agent module 208 also includes a message-receiving module 304. The message-receiving module 304 receives (or otherwise observes or detects) original messages that have been posted by users via the social network module 204 via the interface module(s) 226, assuming that the users have previously added the agent module 208 as a contact to their respective contact lists. The message-receiving module 304 can use any protocol to receive an original message. In one case, the social network module 204 can push the original message to the message-receiving module 304. For example, in one approach, the social network module 204 may forward an original message to a list of recipients, the agent module 208 being one such recipient. Or the social network module 204 can notify the message-receiving module 304 that a new message has been generated for a registered user. The message-receiving module 304 can then access the social network module 204 to identify and retrieve the new message. In another scenario, the message-receiving module 304 may actively poll the social network module 204 to determine whether any new original messages have been posted by a registered user. If so, the message-receiving module 304 can retrieve the new original messages.

An appropriateness-of-reply determination (AORD) module 306 determines whether it is appropriate to respond to an original message that has been posted by a particular user. The AORD module 306 can consider multiple factors in making this decision, as specified by a set of rules provided in a rules store. For example, the AORD module 306 can draw from any one of the following non-exhaustive list of factors.

Structure Information. The AORD module 306 can examine the structure of the original message to determine whether it is appropriate to respond to the original message. For example, in one case, the AORD module 306 is configured to respond to original messages that end in a question mark. The AORD module 306 can also use any type of natural language processing tool(s) to determine whether the user's original message contains a solicitation for help, either directly or indirectly (even though the original message may not end in a question mark). For example, an original message that contains the phrases, "I am trying to," or "I need," or "I would like to," etc. may be soliciting help from others. In other cases, the automated agent module 208 can respond to original messages that raise certain topics, but do not otherwise expressly present questions.

Content Information. The AORD module 306 can examine the content of the original message to determine whether it is appropriate to respond to the original message. For example, certain agent modules may be configured to address certain respective topics. In this case, the AORD module 306 can mine the original message that has been received to determine whether it includes keywords that pertain to its designated topic or topics. The determination of content information can also (or alternatively) be performed by a reply generation module 308, to be described below.

Configuration Information. Each user may define set-up information which determines the circumstances in which the agent module 208 will respond to an original message. The set-up information can be defined in any level of granularity, with respect to any criteria. The AORD module 306 consults this set-up information in determining whether or not to respond to an original message.

Prior Responsiveness of the Agent Module. The agent module 208 can record frequency information which indicates the number of times that it has responded to previous messages for a particular user within a defined time span, such as an hour, a day, a week, etc. The agent module 208 can also maintain configurable threshold information which determines a preferred maximum rate of response. The agent module 208 can then consult the frequency information and threshold information to determine whether it is appropriate to respond to an individual original message under consideration, e.g., based on whether or not such a response will exceed the prescribed threshold information within the given time span.

Responsiveness of Human Contacts. The AORD module 306 can determine whether one or more human contacts have responded to a user's original message. This influences whether the agent module 208 will itself respond to the original message. In one approach, for instance, the AORD module 306 will not respond to an original message if one or more human contacts (or any automated agents) have already responded to the message within a predetermined period of time. After that time has expired without a response, the AORD module 306 may decide that it is appropriate to generate a reply message. But this rule may be qualified in different ways. For example, the AORD module 306 may decide to respond to the original message if a thread of messages suggests that a question raised by an original message remains unresolved, e.g., because the user asks follow-up questions, etc.

Level of Confidence. The AORD module 306 can assess the level of confidence at which it is able to interpret the original message. The AORD module 306 may choose to respond to the original message if it can interpret the message with a confidence above a prescribed threshold; otherwise, the AORD module 306 may decline to respond to the message. The determination of level of confidence can also (or alternatively) be performed by the reply generation module 308, to be described below.

Directedness of the Message. The AORD module 306 can determine whether the original message sent by the user is a direct message or an undirected message (meaning a message that is not targeted to any particular contact). In one implementation, the AORD module 306 can always respond to a directed message because it is apparent that the user is unambiguously asking a question to the agent module 208. In other words, a determination that the message is a directed message can override any of the other AORD factors described above.

Triggering Event(s). In addition to the conditions described above, the AORD module 306 can determine that it is appropriate to the respond to the original message if one or more triggering events have occurred. Different environments can define different types of triggering events. For example, one environment can determine that it is appropriate to respond to the original message if a reply message of a certain type has been received from a human contact of the user, etc.

Norms of Social Interaction. In addition, the AORD module 306 can determine whether and when it is appropriate to respond to the original message based on the norms of social interaction associated with the social network service (in which the original message has been posted). The AORD module 306 can determine these norms through various techniques, such as by determining patterns in interactions that have taken place using the social network service.

To repeat, the factors described above are representative, not exhaustive. The example scenarios set forth below describe additional details regarding the operation of the AORD module 306.

A reply generation module 308 generates a reply message in response to the original message once the AORD module 306 determines that it is appropriate to reply to the message. In doing so, the reply generation module 308 can rely on zero, one, or more agent resources (such as agent resource 210), such as one or more question-answering engines. The reply generation module 308 is shown in FIG. 3 as a distinct component from the AORD module 306; but in some implementations, the AORD module 306 and the reply generation module 308 may represent a single component that performs the functions of the AORD module 306 and the reply generation module 308.

The reply generation module 308 can perform its task based on multiple considerations. For example, the reply generation module 308 can draw from any one of the following non-exhaustive list of considerations.

Semantic Content. The reply generation module 308 can use any natural language processing and/or artificial intelligence tool(s) (for example) to determine the meaning of an original message (in optional conjunction with one or more reply messages). For example, the reply generation module 308 can use any analysis tool(s) to determine the information that is being sought by an original message (if, in fact, the message is a question). For example, the reply generation module 308 can use an entity extraction tool to extract information regarding salient entities mentioned in the original message, such as places, events, personal names, business names, etc. Alternatively, or in addition, the reply generation module 308 can forward the original message in its entirety, or in substantially unaltered form, to a question-answering engine. The question-answering engine may employ its own analysis tools to determine the information being sought by the original message.

Profile Information. The reply generation module 308 can consult profile information in generating a reply message. The profile information may pertain to the user who has posted the message and/or the user's human contacts. For example, assume that the agent module 208 performs a social referral service. If a user asked a question, "What is a good restaurant in Seattle?," the reply generation module 308 can examine the profile information of the user's human contacts to determine if any of these contacts live in Seattle and/or have a specified interest in Seattle. The reply generation module 308 can then generate a reply message which invites the user to contact the identified human contacts, based on the assumption that those contacts may be able to help the user. The reply generation module 308 can rely on a host of additional factors in deciding whether it is appropriate to identify human contacts in a reply message, as will be described below in greater detail. In one case, the reply generation module 308 can gain access to profile information that is independently maintained by the social network module 204, e.g., via the interface module(s) 226. Alternatively, or in addition, the agent module 208 can maintain its own profile information pertaining to users of the social network module 204.

Behavioral Information. The reply generation module 308 can consult behavioral information which describes the behavior of users. That is, the behavioral information may pertain to the behavior of the user who has posted the original message and/or the user's human contacts. The behavioral information may identify any user actions which have a bearing on the generation of a reply message, including, but not limited to: sending messages via the social network module 204, making browsing selections, making online purchases, specifying preferences (e.g., likes and dislikes), and so on. For example, suppose again that the agent module 208 performs a social referral function. Again assume that a user solicits advice about restaurants in Seattle. The reply generation module 308 can identify one or more of the user's human contacts who have sent or replied to messages pertaining to the topic of restaurants in Seattle. In another scenario, the reply generation module 308 can identify one or more of the user's human contacts who have established a regular pattern of interaction with the user. The reply generation module 308 can then generate a reply message which invites the user to contact the identified human contacts, based on the assumption that those contacts may be able to help the user. The reply generation module 308 can mine this kind of behavioral information from any sources, such as the social network module 204, the agent module 208 itself, a third part entity, etc.

Level of Confidence. The reply generation module 308 can assess the level of confidence at which it has generated a reply that is sufficiently germane to the original message. The reply generation module 308 can use various metrics to make this assessment. In one case, the reply generation module 308 can positively weight replies that are built from information extracted from trusted sources (e.g., from trusted websites).

To repeat, the considerations described above are representative, not exhaustive. The example scenarios set forth below describe additional details regarding the operation of the reply generation module 308.

A reply formulation module 310 formulates a reply message based on information extracted by the reply generation module 308. The reply formulation module 310 is shown in FIG. 3 as a distinct component from the reply generation module 308 to facilitate explanation; but in some implementations, the reply generation 308 and the reply formulation module 310 may represent a single component that performs the functions of the reply generation module 308 and the reply formulation module 310.

In one implementation, the reply formulation module 310 may perform its task by drawing on a collection of templates provided in a template store. Each template can provide a model for phrasing a particular response to a certain type of question. For example, assume that the user again appears to be asking for advice on local restaurants. The reply formulation module 310 can choose a template which is germane to this context. The reply formulation module 310 can then customize the template based on information supplied by the reply generation module 308. For example, the template may read, "You may be interested in the restaurant _____, having the website _____," which can be customized to read to provide a restaurant name and URL provided by the reply generation module 308. In some cases, the reply formulation module 310 can provide multiple templates for phrasing a particular reply message. The reply formulation module 310 can randomly select a template from this set of candidate templates to provide variety in its responses. In addition, or alternatively, the reply reformulation module 310 can use natural language functionality or similar tools to generate a response.

Finally, a reply forwarding module 312 forwards the reply message to a target destination via the interface module(s) 226. Different target destinations may be appropriate for different types of social network services. In one case, for instance, the reply forwarding module 312 can forward the reply message to a user page associated with the user who posted the original message, as maintained by the social network module 204, and/or to some other page maintained by the social network module 204. The reply message is then accessible for review by the user and the user's contacts (assuming that the reply message is not a private message). The user and any of the user's human contacts may then, in turn, respond to the automated agent's response message. Alternatively, or in addition, the reply forwarding module 312 can forward the reply message directly to both the user and/or the user's human contacts.

More generally, the reply forwarding module 312 can determine a type of reply message to send to the target destination. For example, a first type of reply message pertains to a public message that is accessible to the user and at least one other individual. A second type of reply message pertains to a private message that is accessible to only the user. The reply forwarding module 312 can determine what type of reply message to send based on one or more considerations, such as: a content of the original message; a manner in which the original message has been posted to the social network module 204; and/or a content of the reply message to be sent to the user, and so on. For example, if the original message and/or reply message have content that appears to be of a personal nature (e.g., referring to a medical or financial topic), then the reply forwarding module 312 can invoke a private response channel. Alternatively, or in addition, the user may have expressly invoked a private response mode (in the illustrative manner to be described below).

In general, the agent module 208 can be designed in an extensible manner. As such, a developer can produce a modified module, such a modified reply generation module, and substitute that module in place of an existing module of that type. Further, the rules, templates, algorithms, etc. employed by individual modules are extensible in design.

Figure 4:
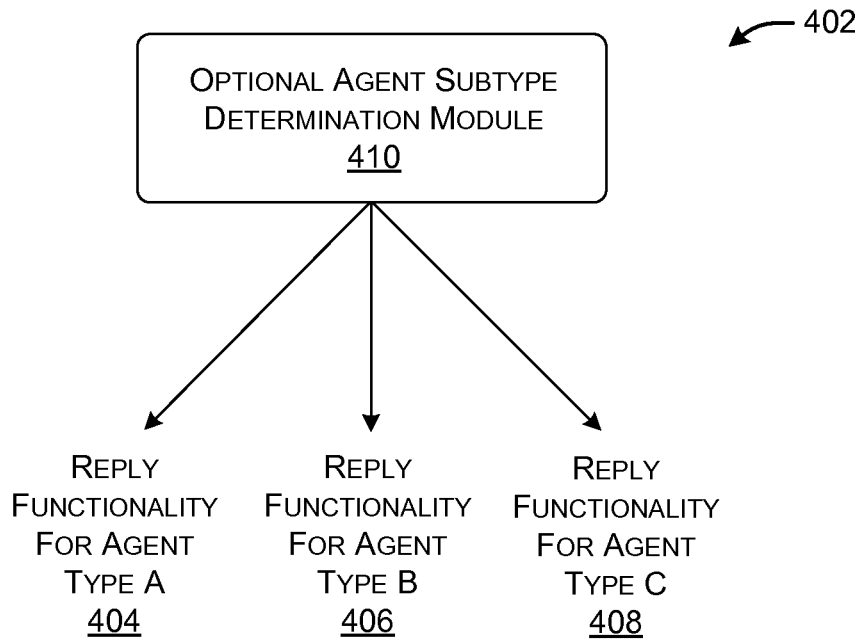
FIG. 4 shows one illustrative implementation of a composite-type automated agent that can be used in the system of FIG. 2.

In one implementation, the agent module 208 of FIG. 3 performs a single function. In contrast, FIG. 4 shows an agent module 402 that allocates separate functionalities (404, 406, 408, . . . ) to different respective functions. The agent module 402 also includes an agent subtype determination module 410 which determines a type of functionality that is being invoked, e.g., in response to the receipt of an original message of a particular type. For example, assume that the agent module 402 performs a question-answering function, a social referral function, and a translation function. Further assume that the user presents an original message which appears to be asking a relatively narrow factual question. In response, the agent subtype determination module 410 can decide to invoke the search functionality to address this question. Alternatively, assume that a user appears to be asking for the opinion of other users regarding a particular topic. Here, the agent subtype determination module 410 can decide to invoke the social referral functionality to address this question. In still other cases, the agent subtype determination module 410 may invoke plural different functionalities to address the same original question; these plural different functionalities may contribute to the same reply message and/or may contribute to multiple separate reply messages.

Figure 5:
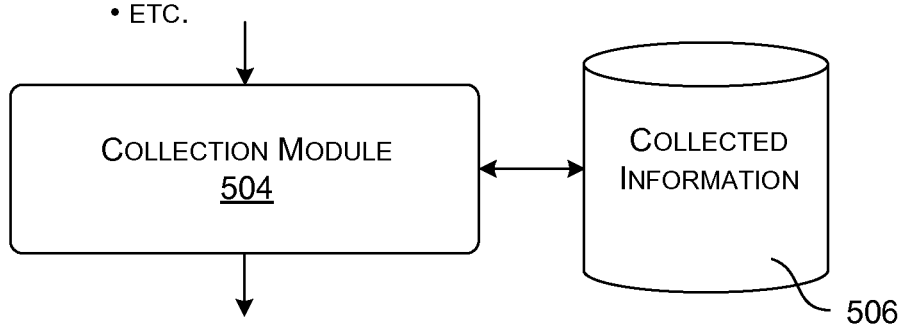
FIG. 5 shows one illustrative implementation of logging functionality that can be used in the system of FIG. 2. The logging functionality provides collected information that can be used to improve the performance of a search engine or any automated agent or some other target functionality.

FIG. 5 shows logging functionality 502 that can be implemented by the social network module 204, the agent module 208, and/or or some other functionality. The logging functionality 502 includes a collection module 504 for storing collected information in one or more data stores 506. The collected information can pertain to any information which characterizes the operation of the system 100. For example, the collected information may describe questions that have been asked, reply messages generated by human contacts, reply messages generated by automated agents, etc. In addition, or alternatively, the collected information can describe other behavior performed by users; for example, the collected information can indicate the manner in which the users responded to reply messages generated by the automated agents (e.g., by indicating whether or not the users clicked on links provided by the human agents, purchased recommended items, etc.).

The collection module 504 can forward the collected information to any type of target functionality for use in improving the performance of the target functionality. For example, collection module 504 can send the collected information to a search engine for the purpose of improving the performance of a ranking algorithm provided by the search engine. Alternatively, or in addition, the collection module 504 can provide the collected information to any agent module for use in improving its ability to provide pertinent replies to original messages. For example, an agent module can determine whether its reply messages were viewed favorably by recipients of those messages (e.g., based on whether these reply messages led to clicks of recommended links, whether the recipients indicated that they "liked" the reply messages, whether the recipients propagated the reply messages to others (e.g., using "retweets"), and so forth). Based on this feedback, the agent module can positively weight the response strategies that received favorable results and negatively weight the response strategies that received poor results. In one approach, an agent module can use machine learning techniques to improve its performance based on the collected information (which constitutes training data). A search engine can adapt its performance in a similar manner.

FIGS. 6-11 describe the operation of different automated agents that perform different respective functions. More specifically, in the following explanation, it will be assumed that each automated agent performs a single function. But, as explained above (with reference to FIG. 4), any automated agent can also perform two or more functions.

Figure 6:
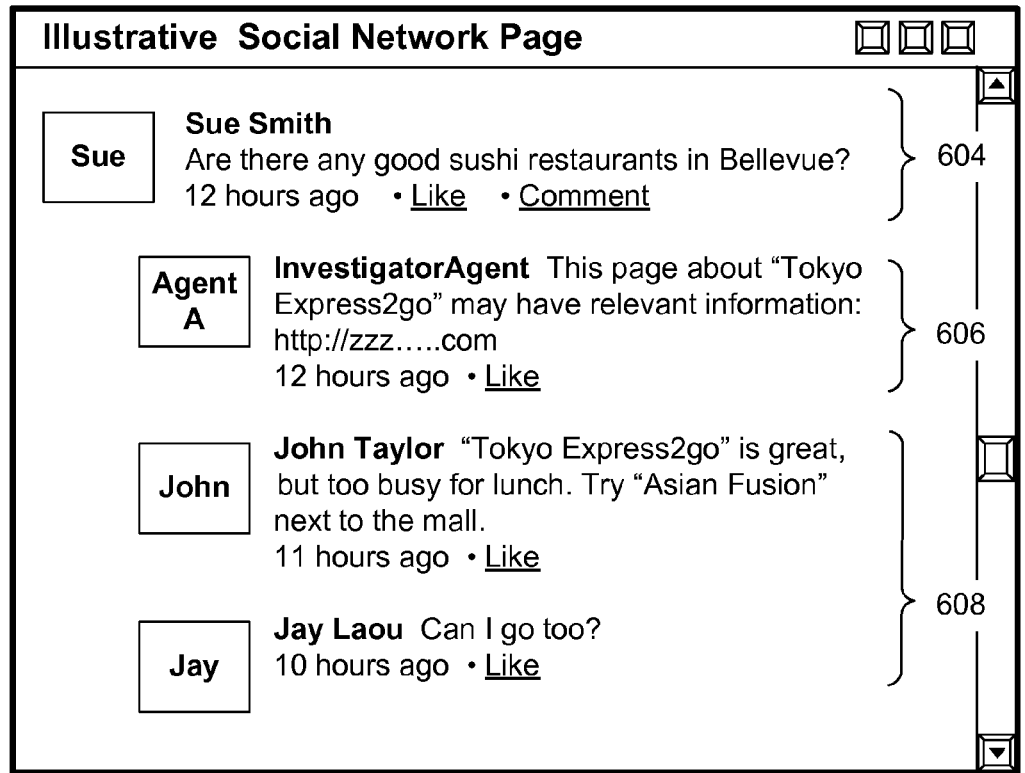
FIGS. 6-11 show examples of the operation of different types of automated agents.

Starting with FIG. 6, this figure shows an example of the operation of an automated agent that performs a question-answering function. Assume that a user, Sue Smith, accesses a user page 602 provided by a social network service (that user page being associated with the user, Sue Smith). There, the user enters an original message 604 that poses a question, "Are there any good sushi restaurants in Bellevue?" For example, the user can enter this original message as a status message (e.g., in the context of an implementation that builds on top of the functionality provided by Facebook, Inc.).

After posting the original message 604, any of the user's human contacts can access and review the original message 604. For example, the user's human contacts can access Sue Smith's user page 602 (or some other mechanism or forum through which the original message 604 is accessible) and review the original message 604. Alternatively, or in addition, the social network service can forward the original message 604 to the human contacts. One or more automated agents (that have been designated as contacts of Sue Smith) can also access the original message 604. For example, as explained above, an automated agent can receive the message using a pull technique, a push technique, or combination thereof.

In the scenario of FIG. 6, the automated agent performs a question-answering function based on the original message 604. First, the automated agent can decide whether it is appropriate to respond to the original message 604. If so, the automated agent can generate a query based on the terms used in the original message 604, e.g., using an entity extraction technique and/or some other natural language processing tool(s). In the present case, the automated agent may construct a query based on the salient keywords "sushi," "restaurants," and "Bellevue." Or the automated agent can generate a query which comprises the original message in unaltered or substantially unaltered form. The automated agent then submits the search query to a question-answering engine (e.g., a search engine) and receives a search result in response. The automated agent can then formulate a reply message 606 on the basis of the search result. Finally, the automated agent posts the reply message 606 on the user's page 602.

The human contacts may also decide to respond before and/or after the automated agent, as indicated by the reply messages 608. In some cases, a human contact may choose to respond to the original message 604. In other cases, a human contact may decide to respond to one or more reply messages, including the reply message 606 of the automated agent.

Further, the system 100 can provide different automated agents that are configured to provide answers in different subject matter domains. The AORD module 306 and/or the reply generation module 308 of each such automated agent can be configured to determine whether an original message pertains to its topic of expertise. If so, the agent module 208 will attempt to address the question; if not, the automated agent will ignore the question. For example, different automated agents can address, respectively, dining-related topics, travel-related topics, medical-related topics, financial-related topics, and so on. Other automated agents can answer questions regarding two or more subject matter domains.

Other automated agents can address questions and/or provide answers which emphasize regional issues. For example, such an automated agent can recommend local businesses in response to a query. The location of the person posing a question can be determined in various ways, e.g., based on the user's profile information, reverse-IP lookup strategies, cell tower or WiFi triangulation techniques, GPS techniques, etc.

Figure 7:
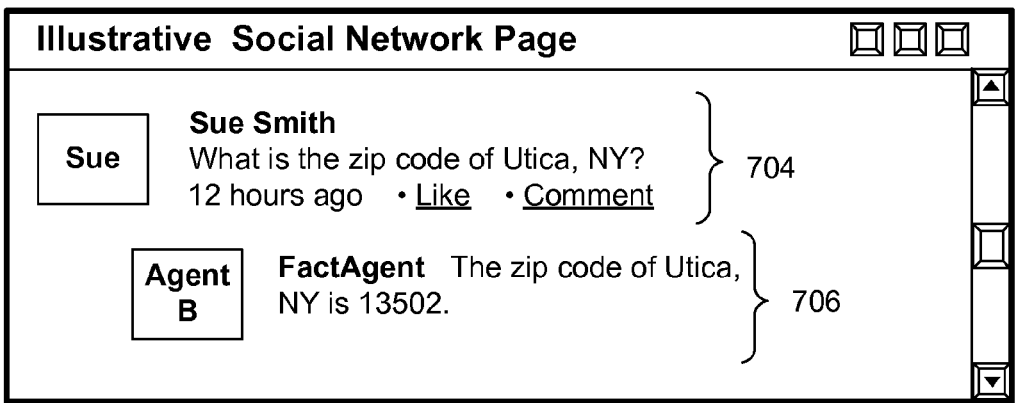

FIG. 7 describes the operation of an automated agent that also performs a question-answering function. But in this case, the automated agent is configured to provide targeted factual-related information in response to a query, rather than general information which may be of possible interest to the user. For example, assume that the user Sue Smith accesses her user page 702 and enters the original message 704, "What is the zip code of Utica, N.Y." The automated agent responds by performing a search, to retrieve an indication that the zip code is 13502. The automated agent formulates a reply message 706 which conveys the identified factual information. The type of factual-based automated agent shown in FIG. 7 may be invoked when the automated agent detects certain fact-based themes in the original message, e.g., pertaining to weather-related topics, movie schedule topics, sports score topics, etc. In another case, a single automated agent can provide both link-containing general information and targeted factual information. That is, the automated agent can provide targeted factual information if possible; if not, it may provide a link containing more general information of possible interest to the user.

Another type of automated agent responds to a question or other expression of an information need by providing an opinion or advice. For example, a user may pose a question that reads, "Has anybody been successful in refinancing their mortgage?" A political automated agent may respond by expressing some type of political opinion about the housing market.

Figure 8:

FIG. 8 shows an example in which an automated agent performs a social referral function. In this case, the user Sue Smith accesses her user page 802 and enters the same original message 804 in an attempt to solicit advice regarding sushi restaurants in Bellevue. In response, the automated agent can consult the profile information associated with Sue Smith's human contacts. And from that information, the automated agent can determine that John Taylor (one of Sue's contacts) lives and/or was raised in the Bellevue area (as conveyed by the user's profile information), and therefore may be familiar with its local restaurants. More specifically, the automated agent can apply a distance-based filter to determine whether location information specified in the original message is sufficiently close to location information specified in a human contact's profile. In addition, or alternatively, the automated agent can determine that John Taylor has expressed an interest in Asian dining (as conveyed by that user's profile information and/or behavioral information). In response, the automated agent can generate and send a reply message 806 that reads, "Your friend John Taylor may know something about Asian food." In response to this recommendation, the user Sue Smith may decide to contact John Taylor.

The automated agent can apply any number of factors in deciding whether it is appropriate to identify a particular human contact (in addition to the information imparted by profile information and behavioral information). Such factors include any one or more of the following.

Contact Preference Information. The automated agent can take into consideration preference information established by the user's human contacts (e.g., as specified in a set-up phase). The preference information expresses a human contact's willingness to assist another user who poses a question. More specifically, each human contact can express his or her preferences in any level of granularity. For example, the human contact can prohibit (or permit) participation with respect to certain people, certain topics, certain dates, certain times of days, and so on.

Relationships among Users. The automated agent can take into consideration the relationships between the user and each of her human contacts in deciding whether it is appropriate to contact a particular human contact. For example, the user may not wish to bother work colleagues for certain topics or any topic. The automated agent can also consider the strength of the relationship between a user and each of his or her human contacts. In one implementation, the automated agent can treat the number of shared friends as an indicator of closeness of relationship; that is, if a user and a human contact have a significant number of friends in common, the user and the human contact likely have a close relationship.

In some cases, the automated agent can identify two or more human contacts in a single reply message. The automated agent can apply various considerations in determining the appropriateness of combining contacts together in this manner. For example, it may be considered inappropriate to generate a reply message that lists two people who do not know each other, or who dislike each other, etc.

Frequency of Response. The automated agent can take into consideration the number of times that each human contact has been asked to assist other users within a predetermined period of time, e.g., within the last hour, day, week, etc. The automated agent can apply this consideration to avoid inundating a human contact with too many requests for help in a short period of time.

Level of Interaction. The automated agent can gauge how often the user interacts with each of her human contacts in deciding whether to identify a particular human contact in a reply message. Based on one strategy, the automated agent can favor those human contacts who regularly interact with the user, based on the assumption that communication with those users is natural and expected. However, as noted above, the automated agent may attempt to avoid inundating any one human contact with too many help requests.

Availability. The automated agent can take into consideration the availability of each human contact. For example, the automated agent may favor those human contacts who are presently online.

Favors Owed. A user who has posted a message may have answered a question posed by one of her human contacts on one or more prior occasions. The automated agent can take this information into consideration in deciding whether to identify a particular human contact in response to the user's own question. That is, the automated agent can choose a human contact who has received help from the user because this person may feel obligated to help the user out in the present circumstance.

The above-noted factors are cited by way of example, not limitation. An automated agent that performs a social referral function can take into consideration additional factors. Further, the automated agent can be designed in an extensible manner to accommodate the introduction of new factors and the modification of existing factors.

Figure 9:

FIG. 9 shows an example of an automated agent that performs a translation function. Here, the user Sue Smith accesses her user page 902 and enters the original message 904, "Anybody know how to say 'goodbye' in Spanish?" The automated agent detects that this message pertains to a foreign language (e.g., due to the presence of the word "Spanish," coupled with the word placed in quotations, i.e., "goodbye"). In response, the automated agent consults a translation dictionary and generates a reply message 906 that notifies the user of the translation of the word "goodbye." In this case, the agent resource that is consulted corresponds to a translation dictionary, rather than a search engine.

Figure 10:

FIG. 10 shows an example of an automated agent that is sponsored by an entity, such as a commercial entity. The automated agent in this case may bias its results towards products or services associated with the sponsoring entity. For example, the user accesses her user page 1002 and enters the original message 1004, "I need a new camera for my vacation. Any suggestions?" An automated agent sponsored by a camera manufacturer may detect the telltale word "camera," which triggers a response from this automated agent. Namely, the automated agent responds with the reply message 1006 that promotes a particular camera produced by the camera manufacturer. In some cases, a sponsored automated agent can also offer coupons or discounts of any kind. In addition, or alternatively, the automated agent can select a coupon for presentation to a user based on profile information associated with the user.

Figure 11:
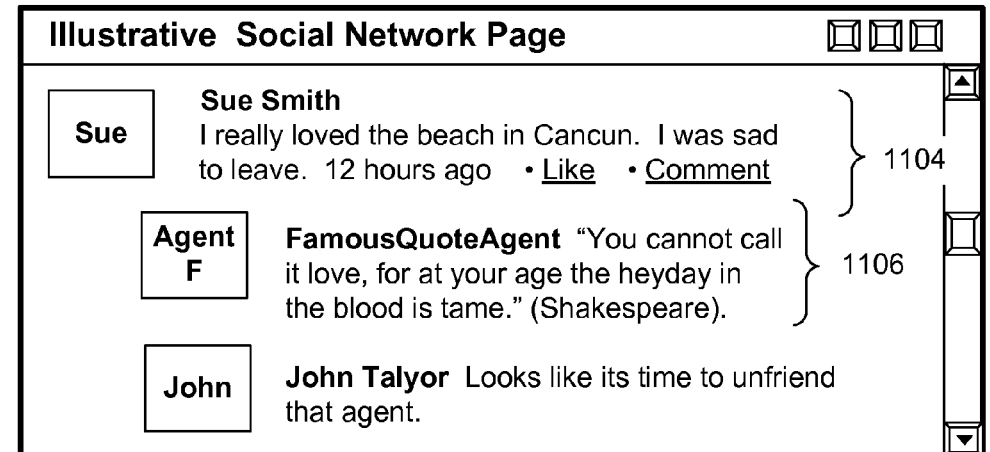

FIG. 11 shows a final example of an automated agent that interjects famous quotes into a conversation. Here, the user Sue Smith accesses her user page 1102 and enters an original message 1104 that contains the word "loved." The automated agent detects this telltale word and delivers a reply message 1106 that pertains to the topic of love.

Note that tone adopted by the automated agent in FIG. 11 is somewhat sharp. In general, automated agents can be designed to exhibit any style of presentation or "personality." For example, an automated agent can be designed to adopt humorous mannerisms, sarcastic or flippant mannerisms, slang or "hip" mannerisms, and so forth.

Generally, the system 100 can be constructed to have an extensible design with respect to automated agents. This permits a developer to create a new automated agent and "plug" it into the extensible framework of the system 100, providing that the new automated agent conforms to an interface model adopted by the extensible framework.

As another general feature, an automated agent can have the indirect effect of stimulating conversation. For example, a human contact may be more inclined to contribute to an ongoing conversation that has at least one other response, even if that response is a reply message generated by an automated agent. In addition, a human contact may be intrigued by the response of the automated agent. For example, a human contact may wish to supplement or correct the information provided by the automated agent. Or the human contact may find the reply message unexpected and potentially humorous, even if that reply message is not completely on point.

Figure 12:
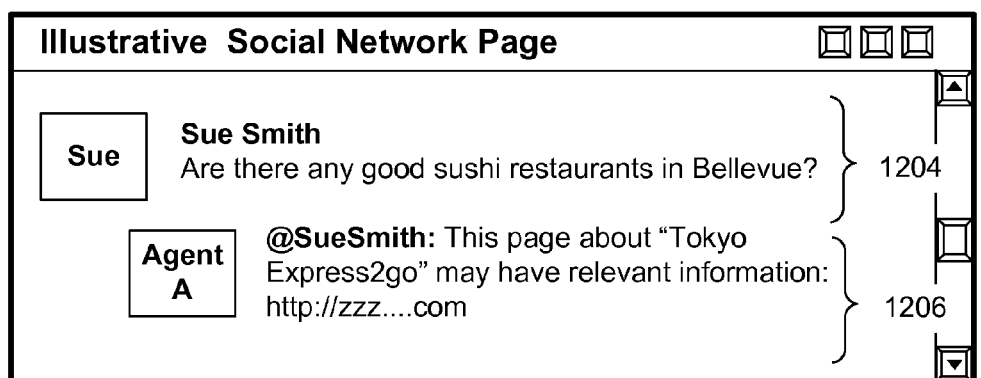
FIG. 12 shows an example of the operation of an automated agent that interacts with a type of social network service that involves the sending and receiving of short messages.

FIG. 12 shows an example of the operation of an automated agent that interacts with a social network service that involves the sending and receiving of short messages. In this case, the user accesses her user page 1202 and enters the same original message 1204 as before, pertaining to sushi restaurants in Bellevue. In this case, the social network service sends the original message 1204 directly to all of the followers of the user Sue Smith. Assume that an automated agent that performs a question-answering function is one of the followers that receives the original message 1204. It may respond by generating and sending the reply message 1206. In this case, the automated agent can send the reply message 1206 using the "@" convention, e.g., by sending it back to the user Sue Smith in a message that begins "@Sue Smith: . . . ".

Figure 13:
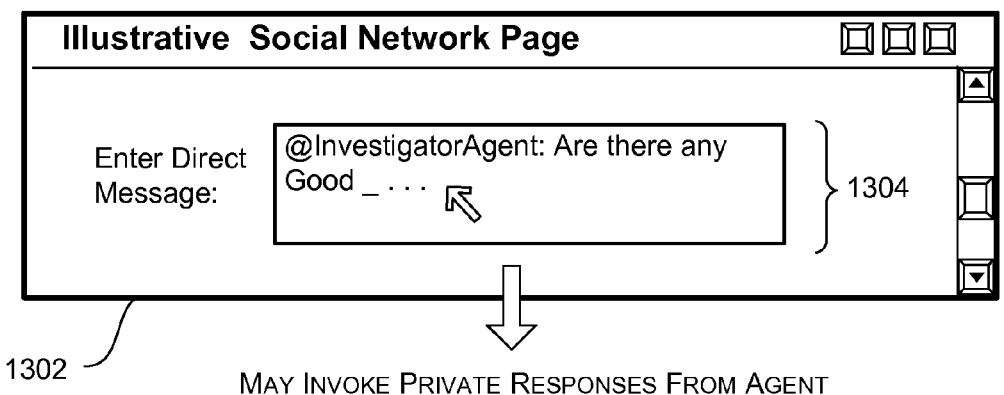
FIG. 13 shows an example of the generation of a direct message that may prompt an automated agent to send, in response, a private reply message.

FIG. 13 shows an example in which the user, Sue Smith, accesses her user page 1302 to generate a direct message to an automated agent, e.g., using a direct input mechanism 1304. The user can achieve the same result in Twitter using the "@" convention, among other techniques. In response, the automated agent can send a private reply message that is accessible to only the user Sue Smith. This is different than the reply messages described earlier, which are accessible to all of the user's contacts, and potentially accessible to the general public. In other words, sending a direct message can be used to instruct the automated agent to send a private reply message in return (this being one possible way, among other possible ways, of invoking a private reply). This approach may also be appropriate to expressly instruct the automated agent to answer the question (because otherwise there is a possibility that the automated agent may choose to ignore the question). This approach may also be appropriate to solicit a more detailed reply from the automated agent, and/or a reply regarding a private topic.

Figure 14:
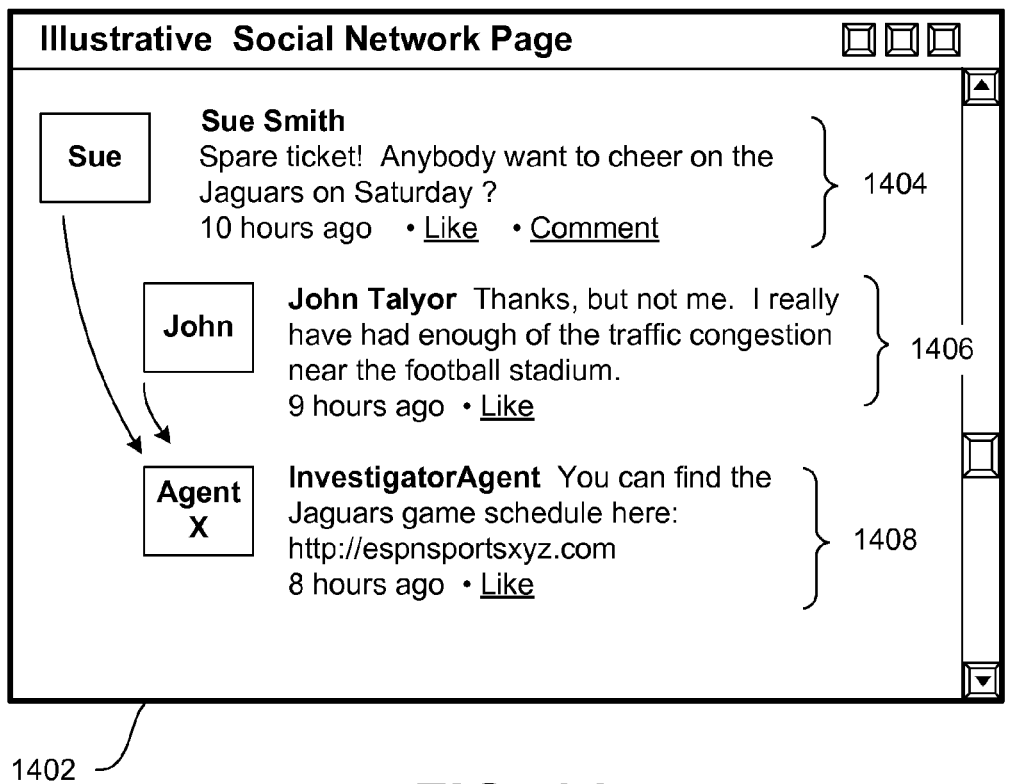
FIG. 14 shows an example of the operation of an automated agent that responds, at least in part, to a reply message authored by a human contact.

FIG. 14 describes a scenario in which the user, Sue Smith, accesses her user page 1402 and generates the original message 1404, "Spare ticket! Anybody want to cheer on the Jaguars on Saturday?" It is apparent to human users that the user is referring to a football game, where one of the teams is named the "Jaguars." But this may not be apparent to an automated agent. If the automated agent considers the original message 1404 ambiguous, it may opt to wait until one or more human contacts offer reply messages. These reply messages may clarify the nature of the original message 1404. For example, in the example of FIG. 14, the human contact John Taylor submits the reply message 1406, "Thanks, but not me. I have had enough of the traffic congestion near the football stadium." This message clarifies that the "Jaguars" in question is a football team, not an animal or an automobile. At this juncture, the automated agent may choose to provide a reply message 1408. More generally stated, the automated agent can take into consideration any number of messages in generating a reply message. The messages can be extracted from a single thread or multiple threads.

In yet other cases, the automated agent can expressly send a message which requests clarification from the user and anyone else that chooses to answer. For example, the automated agent can generate a reply message that reads, "Do you mean Jaguars the animal, or the sports team, or the automobile, or something else?" Responses to these questions can be stored by the logging functionality 502 and later used to improve the performance of the automated agent and/or the question-answering engine.

In yet other cases, the automated agent can solely respond to a reply message sent by a human contact or a user's follow-up message. For example, suppose that a human contact recommends a restaurant in response to a question from the user. The automated agent can provide the telephone and address of the restaurants, etc.

Figure 15:
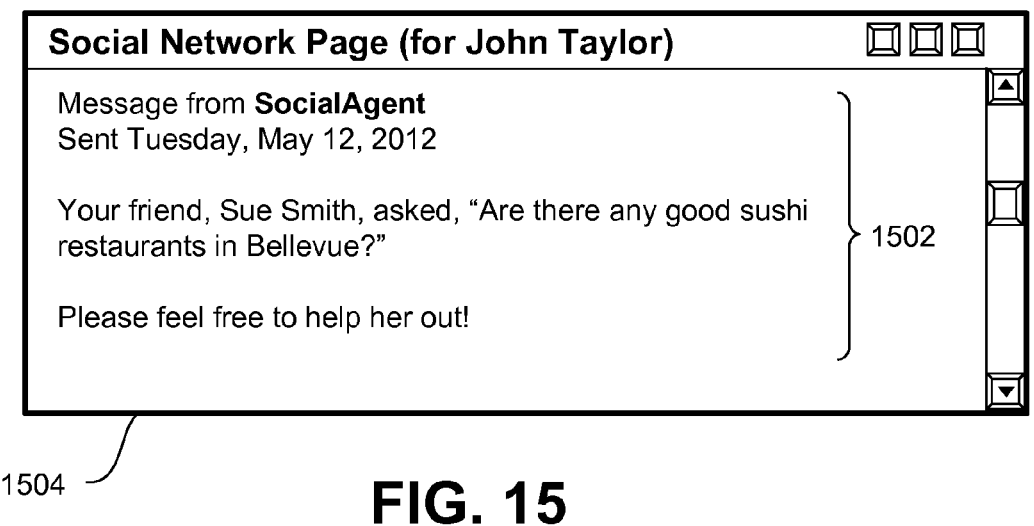
FIG. 15 shows an example of a message that an automated agent directly sends to a human contact.

FIG. 15 provides an example in which an automated agent provides a message 1502 directly to the user John Taylor, asking this user if he would like to assist Sue Smith regarding a question that she has posed. In one case, John Taylor can access this message via his own user page 1504, hosted by the social network service. This approach is in contrast to the scenario of FIG. 8, in which the automated agent notifies Sue Smith that John Taylor may be able to assist her with her question. Or the automated agent can combine the functionality illustrated in FIGS. 8 and 15.

B. Illustrative Processes

FIGS. 16-23 show procedures which explain one manner of operation of the system 100 of FIG. 1. Since the principles underlying the operation of the system 100 have already been described in Section A, certain operations will be addressed in summary fashion in this section.

Figure 16:
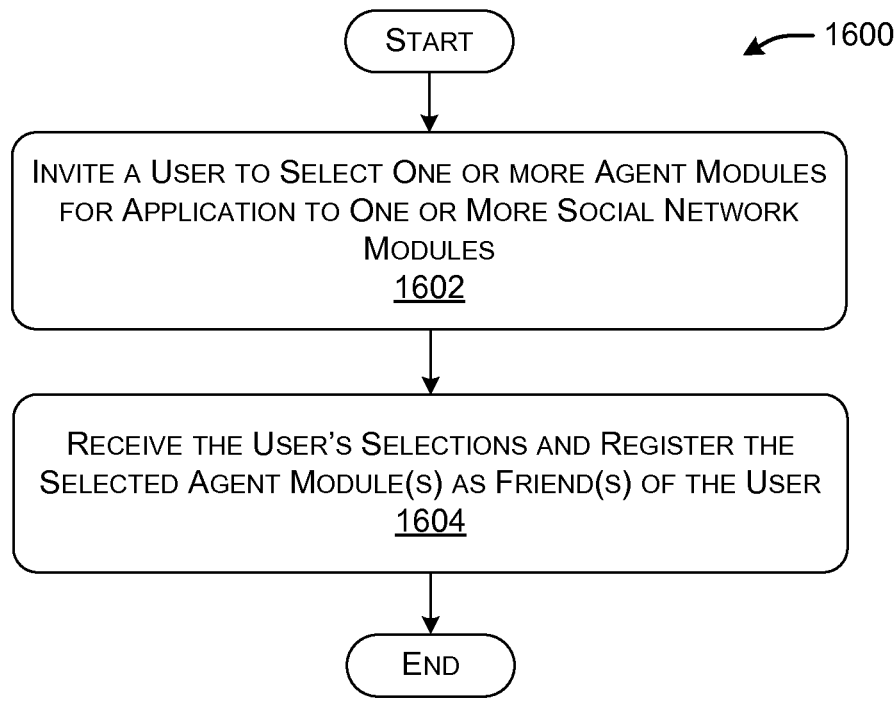
FIGS. 16 and 17 are flowcharts that show, respectively, procedures for receiving indications that a user has added and removed an automated agent as a friend.
Figure 17:
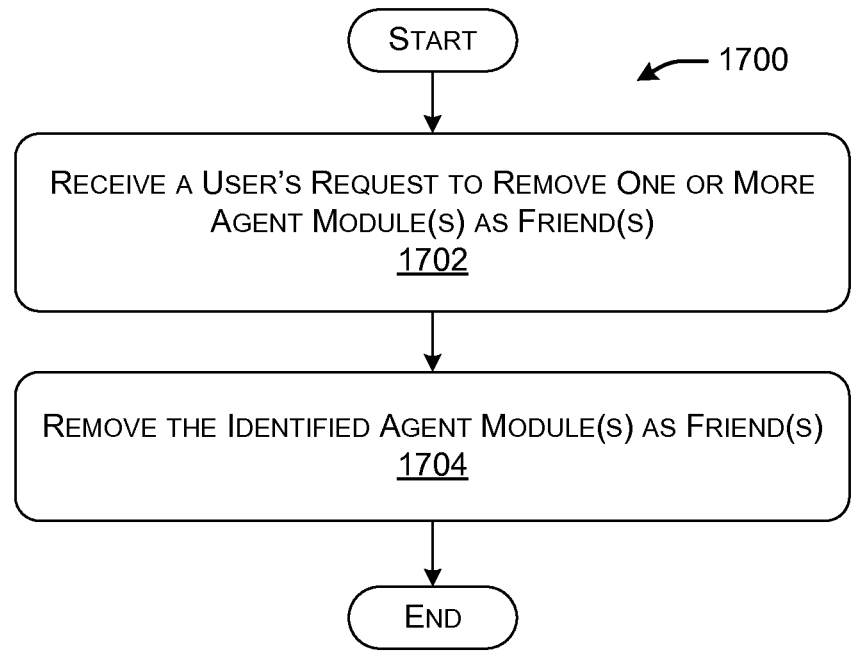

Starting with FIG. 16, this figure shows a procedure 1600 by which the system 100 registers one or more agent modules as friend(s) of a user. In block 1602, the system 100 can invite the user to select one or more agent modules for application to one or more social network modules. In block 1604, the system 100 registers the agent module(s) as friend(s) of the user. Different environment-specific protocols can be used to perform the procedure 1600, as set forth in Section A. FIG. 17 shows a complementary procedure 1700 by which the system 100 can remove one or more agent modules as friends. In block 1702, the system 100 receives a request from a user to remove one or more agent modules as friends. In block 1704, the system 100 removes the agent module(s) as friend(s).

Figure 18:
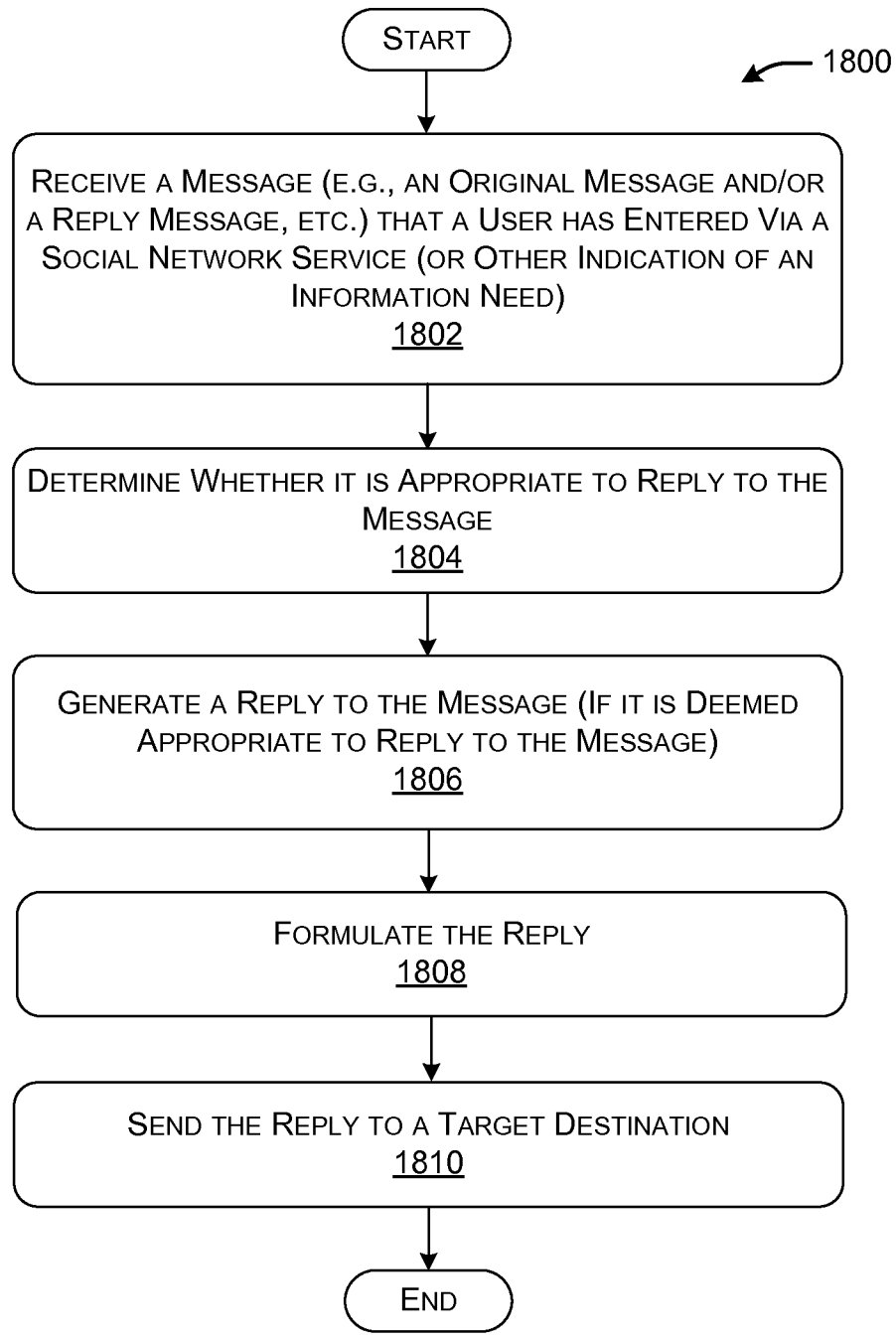
FIG. 18 is a flowchart that shows an overview of one manner of operation of the automated agent.

FIG. 18 shows a procedure 1800 by which an agent module can respond to an original message posted by a user via a social network module (or other information need expressed via the social network module), explained here in summary fashion. The original message may correspond to an initial message which poses a question, a reply message, or a combination of plural messages of any type. To facilitate description, it will be assumed, however, that the agent module receives and responds to a single message.

In block 1802, the agent module receives (or otherwise detects or observes) an original message that indicates that a user has generated and posted an original message via a social network module. The agent module can perform this function using a pull technique, a push technique, or a combination thereof. In block 1804, the agent module can take into consideration multiple factors to determine whether it is appropriate to reply to the original message. In block 1806, the agent module generates a reply to the original message, again taking into account one or more considerations. In block 1808, the agent module formulates a reply message. Any part of blocks 1804-1808 may be alternatively merged into a single operation of generating a reply message. Finally, in block 1810, the agent module sends the reply message to a target destination, e.g., either a user page of the user who generated the original message, and/or to individual human contacts, etc. The agent module can also consult one or more factors to determine an appropriate manner in which to the send the reply message to the target destination, as described in Section A.

Figure 19:
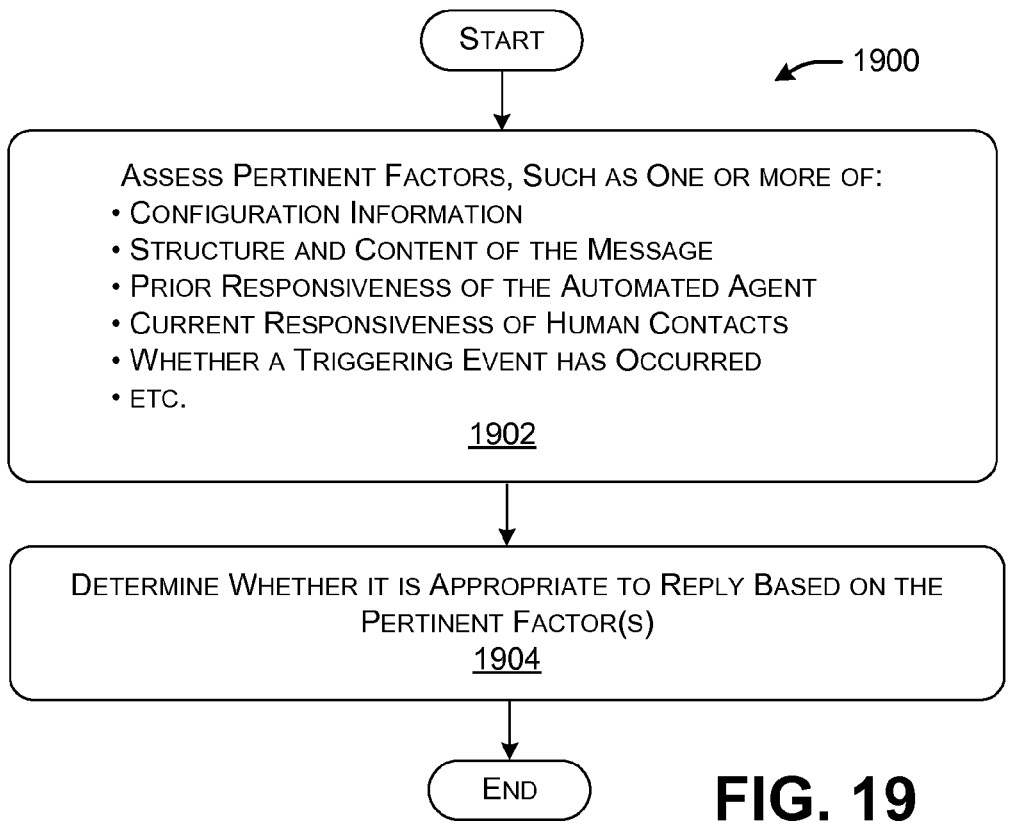
FIG. 19 is a flowchart that shows one manner by which an automated agent can decide whether to respond to a message.

FIG. 19 shows a procedure 1900 which explains one manner of operation of the appropriateness-of-reply determination (AORD) module 306 of FIG. 3, explained here in summary fashion. In block 1902 the AORD module 306 assesses pertinent factors that may have a bearing on whether or not to respond to an original message. Those factors include the structure and content of the original message, express set-up information which governs the manner of operation of the agent module for a particular user, the prior responsiveness of the agent module, the current responsiveness of human contacts, the occurrence(s) of one or more triggering events, and so on. These factors were described in greater detail in Section A. In block 1904, the AORD module 306 determines whether to respond based on the factors summarized in block 1902.

Figure 20:
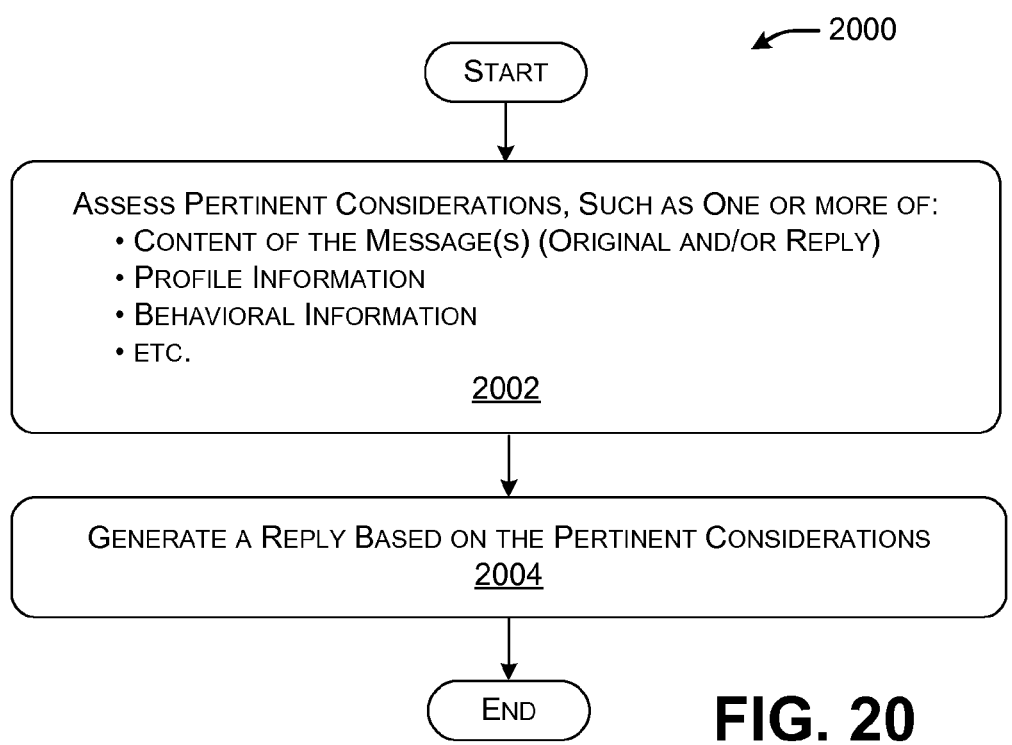
FIG. 20 is a flowchart that shows one manner by which an automated agent can generate a response to a message.

FIG. 20 shows a procedure 2000 which explains one manner of operation of the reply generation module 308 of FIG. 3, explained here in summary fashion. In block 2002 the reply generation module 308 assesses pertinent considerations that may have a bearing on how to construct a reply message. Those factors include the semantic content of the original message (and/or any reply message(s)), profile information, behavioral information, and so on. These considerations were described in greater detail in Section A. In block 2004, the reply generation module generates a reply message based on the considerations summarized in block 2002.

Figure 21:
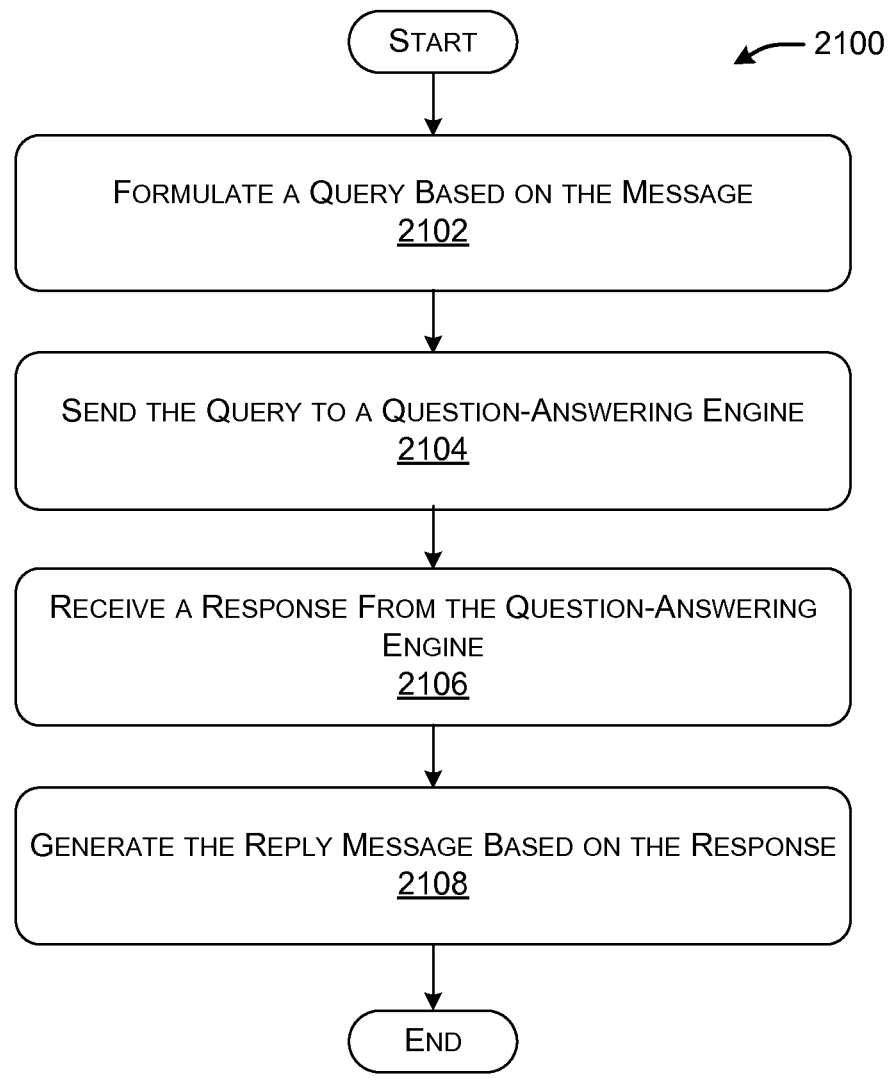
FIG. 21 is a flowchart that shows one manner of operation of an automated agent that performs a question-answering function.

FIG. 21 shows a procedure 2100 that represents one manner of operation of an agent module that performs a question-answering function, described here in summary fashion. In block 2102, the agent module formulates a query based on an original message. In block 2104, the agent module sends the query to a question-answering engine (e.g., a search engine) or some other agent resource. In block 2106, the agent module receives a response from the question-answering engine. In block 2108, the agent module generates a reply message based on the response received from the question-answering engine. In one implementation, the agent module, in conjunction with the question-answering engine can perform a personalized search for the user based on user information that is extracted from the user's profile information, behavioral information, and/or other sources.

Figure 22:
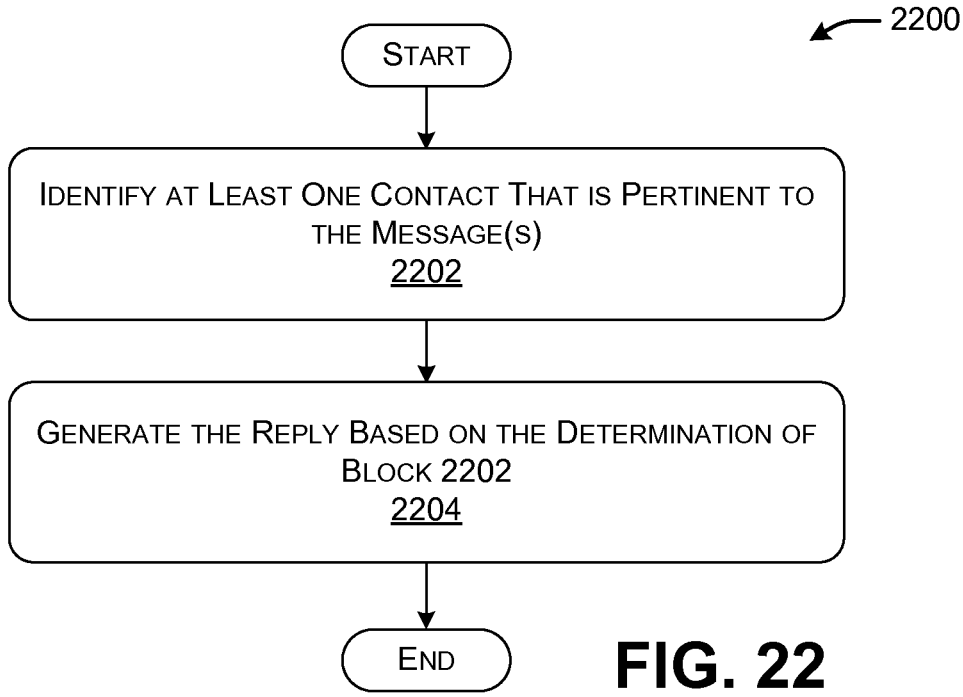
FIG. 22 is a flowchart that shows one manner of operation of an automated agent that performs a social referral function.

FIG. 22 shows a procedure 2200 that represents one manner of operation of an agent module that performs a social referral function, described here in summary fashion. In block 2202, the agent module identifies at least one human contact that is pertinent to the original message, e.g., using profile information, and/or behavioral information, etc. In block 2204, the agent module generates a reply message based on the human contact(s) identified in block 2202.

Figure 23:
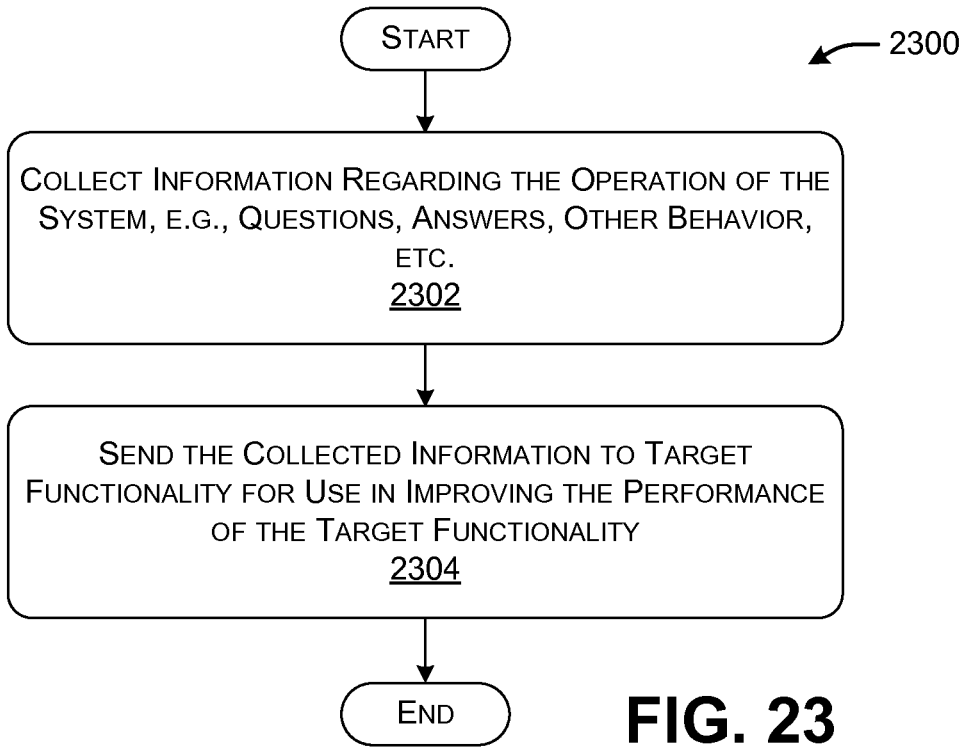
FIG. 23 is a flowchart that shows one manner of operation of logging functionality.

FIG. 23 shows a procedure 2300 that explains one manner of operation of the logging functionality 502 of FIG. 5, described here in summary fashion. In block 2302, the logging functionality collects information regarding the operation of the system 100, such as questions posed, answers given, etc. In block 2304, the logging functionality 502 sends the collected information to any target functionality for use in improving its performance. The target functionality may comprise a search engine, an agent module, etc.

As a closing point, the system 100 described herein can employ various mechanisms to ensure the privacy of user data maintained by the system. For example, the system 100 can allow a user to expressly opt in (and then expressly opt out of) the provisions of the system 100. The system 100 can also provide suitable security mechanisms to ensure the privacy of the user data (such as encryption mechanisms, password-protection mechanisms, etc.). The system 100 can also allow a user to control the manner in which the system 100 uses the data. The system 100 can also allow the user to delete his or her user data at any time.

C. Representative Processing Functionality

FIG. 24 sets forth illustrative computing functionality 2400 that can be used to implement any aspect of the functions described above. For example, the computing functionality 2400 can be used to implement any aspect of the system 100 of FIG. 1, e.g., as implemented in the embodiment of FIG. 2, or in some other embodiment. In one case, the computing functionality 2400 may correspond to any type of computing device that includes one or more processing devices. In all cases, the computing functionality 2400 represents one or more physical and tangible processing mechanisms.

The computing functionality 2400 can include volatile and non-volatile memory, such as RAM 2402 and ROM 2404, as well as one or more processing devices 2406 (e.g., one or more CPUs, and/or one or more GPUs, etc.). The computing functionality 2400 also optionally includes various media devices 2408, such as a hard disk module, an optical disk module, and so forth. The computing functionality 2400 can perform various operations identified above when the processing device(s) 2406 executes instructions that are maintained by memory (e.g., RAM 2402, ROM 2404, or elsewhere).

More generally, instructions and other information can be stored on any computer readable medium 2410, including, but not limited to, static memory storage devices, magnetic storage devices, optical storage devices, and so on. The term computer readable medium also encompasses plural storage devices. In all cases, the computer readable medium 2410 represents some form of physical and tangible entity.

The computing functionality 2400 also includes an input/output module 2412 for receiving various inputs (via input modules 2414), and for providing various outputs (via output modules). One particular output mechanism may include a presentation module 2416 and an associated graphical user interface (GUI) 2418. The computing functionality 2400 can also include one or more network interfaces 2420 for exchanging data with other devices via one or more communication conduits 2422. One or more communication buses 2424 communicatively couple the above-described components together.

In closing, the description may have described various concepts in the context of illustrative challenges or problems. This manner of explication does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by an automated agent module executing on one or more computers, comprising:
   accessing a social network module comprising accounts of respective users registered to use the social network service, each account comprising a respective contact list and user page, wherein each contact list authorizes contacts therein to both display and post messages to the corresponding user's user page, a user's user page, when displayed by devices operated by the user and the user's contacts, comprising a message display area to display messages posted by the corresponding user and the corresponding user's contacts, and further comprising a message input area through which messages are inputted and added to the message display area;
   receiving, by the automated agent module, a message sent to the agent module responsive to the message being posted by the user to the user page via the message input area, the automated agent module and the users in the user's contact list having been previously added to the user's contact list by the user using a contact adding/removing module of the social network module, the message having been sent to the automated agent module due to the automated agent module being a contact of the user;
   responsive to receiving the message, analyzing content of the message to decide whether the automated agent module is to reply to the message;
   responsive to deciding to reply to the message, generating a reply message by passing the content of the message to a search engine and adding a search result of the search engine to the reply message; and
   posting the reply message to the user's user page, and in response the social network module adding the reply message to the message display area to be displayed therein with replies to the message that were posted via the input area by from the user's other contacts, the user's user page indicating that the reply message from the automated agent module and the replies from the user's other contacts are associated with the message.

2. The method of claim 1, wherein said deciding whether to reply to the message comprises:
   determining whether a topic of the content corresponds to a topic associated with the agent module.

3. The method of claim 1, wherein said deciding whether to reply to the message further comprises:
   determining whether a contact of the user has posted a reply to the message.

4. The method of claim 1, wherein said generating the reply message is based on profile information associated with one or more of the user and contacts of the user.

5. The method of claim 1, wherein said generating the reply message is based on behavioral information associated with one or more of the user and the contacts of the user.

6. The method of claim 1, wherein said generating the reply message is based on content of at least one reply message posted to the user's user page by at least one other contact of the user in response to the message.

7. The method of claim 1, wherein the reply message identifies a network resource that is relevant to the content of the message.

8. The method of claim 1, wherein said generating comprises:
identifying at least one contact of the user that is pertinent to the original message; and generating the reply based on said at least one contact that has been identified.

9. The method of claim 1, further comprising determining whether to send the reply message to a destination other than the user's user page.

10. A method according to claim 1, further comprising providing, to the automated agent module, a first reply message that was posted by one of the user's contacts other than the automated agent module, wherein the first reply message was posted as a reply to the message, and wherein the automated agent module generates a second reply message based on the provided reply and posts the second reply message to the user's user page, the user's user page indicating that the second reply message is a reply to the first reply message.

11. A method according to claim 10, wherein the other contact comprises a second automated agent module.

12. A method according to claim 1, wherein the content comprises text inputted by the user, and wherein the deciding whether to reply by the automated agent module by analyzing the content comprises: analyzing the text to determine that the text indicates a solicitation for information.

13. A method performed by one or more processing devices to use an automated agent module that performs a question-answering function when executed by the one or more processing devices, the method comprising:
detecting an original message that has been posted by a user via a social network module, the original message posted by the user to a user page managed by the social network module, wherein the user and contacts of the user post messages to the user page, the automated agent module having been designated as one of the contacts of the user of the social network module, the contacts including the automated agent module and at least another user of the social network module, both of which were added to a contact list of the user maintained by the social network module, the contacts having been added by the user interacting with the social network module to select the other user and the automated agent module as contacts to be added to the contact list, wherein the social network module responds to the original message by selecting and notifying at least two of the contacts of the original message, the selected contacts including the other user and the automated agent module;
responsive to being notified of the original message, generating, by the automated agent module, a reply message to the original message, the generating comprising:
formulating a query based on the original message;
sending the query to a question-answering engine;
receiving a response from the question-answering engine; and
generating the reply message based on the response; and
sending the reply message to the social network module which responds by posting the reply message to the user's user page, wherein the reply message is posted on the user's user page and wherein a reply message from the other user is also posted to the user's user page, and wherein the user page indicates that the reply message from the automated agent module and the reply message from the other user are both replies to the original message.

14. A method according to claim 13, wherein the query is also formulated based on at least one reply message provided by at least one other contact of the user in response to the original message.

15. A method performed by a social network system, the social network system comprising a plurality of servers, the social network system maintaining lists of contacts of respective users of the social network system, the social network system enabling users of the social network to add and remove users and automated agents to the contact lists, the method comprising:
receiving a request from a user to add an automated agent to the contact list of the user, the user's contact list having contacts comprising other users of the social network system and the automated agent;
receiving an inquiry message posted by the user to a message posting interface managed by the social network system and controlled by the user, wherein access to the message posting interface is provided to whichever users of the social network system are included in a contact list of the user that is also managed by the social network system, messages to and from the user are included in the message posting interface, and wherein the message posting interface indicates which messages therein are replies to which other messages therein;
responding to the posting of the inquiry message by determining that the inquiry message comprises a question, and in response sending the inquiry message or notifications thereof, via the social network system, to two contacts of the user on the basis of the two contacts being contacts of the user, wherein one of the two contacts is the automated agent and the other of the two contacts is a first user of the social network system;
receiving a reply from the automated agent, the reply comprising information obtained by the automated agent sending the inquiry message or notification thereof to a search engine and in response receiving the information from the search engine, the information corresponding to the information inquiry, and receiving a first reply from the first user; and
posting the reply and the first reply to the message posting interface, which indicates that the reply and the first reply are replies to the inquiry message.

* * * * *